US012757141B1

(12) United States Patent
Akella et al.

(10) Patent No.: US 12,757,141 B1
(45) Date of Patent: Oct. 6, 2026

(54) SYSTEMS AND METHODS FOR LATENCY EQUALIZATION IN A SATELLITE CELLULAR TELECOMMUNICATIONS NETWORK

(71) Applicant: Space Exploration Technologies Corp., Hawthorne, CA (US)

(72) Inventors: Ramakrishna Akella, San Diego, CA (US); Chen Chen, Irvine, CA (US); Darren E. Smith, Redmond, WA (US); Brian Dunn, San Carlos, CA (US)

(73) Assignee: Space Exploration Technologies Corp., Starbase, TX (US)

( * ) Notice: Subject to any disclaimer, the term of this patent is extended or adjusted under 35 U.S.C. 154(b) by 333 days.

(21) Appl. No.: 18/425,414

(22) Filed: Jan. 29, 2024

Related U.S. Application Data

(60) Provisional application No. 63/442,642, filed on Feb. 1, 2023.

(51) Int. Cl.
*H04W 56/00* (2009.01)
*H04B 7/185* (2006.01)
*H04B 7/212* (2006.01)

(52) U.S. Cl.
CPC .... *H04W 56/0045* (2013.01); *H04B 7/18513* (2013.01); *H04B 7/2125* (2013.01)

(58) Field of Classification Search
CPC .............. H04W 56/0045; H04W 84/06; H04B 7/18513; H04B 7/2125
See application file for complete search history.

(56) References Cited

U.S. PATENT DOCUMENTS

| | | | | |
|---|---|---|---|---|
| 5,640,166 A * | 6/1997 | Siwiak | H04B 7/208 455/12.1 |
| 6,181,912 B1 * | 1/2001 | Miller | H04B 7/2125 455/12.1 |
| 9,973,264 B2 | 5/2018 | Vasavada et al. | |
| 10,084,535 B1 | 9/2018 | Speidel et al. | |
| 10,436,706 B2 | 10/2019 | Michaels | |
| 10,979,133 B2 | 4/2021 | Avellan et al. | |
| 10,985,834 B2 | 4/2021 | Speidel et al. | |
| 11,463,159 B2 | 10/2022 | Yu et al. | |
| 11,546,726 B2 | 1/2023 | Speidel et al. | |
| 11,750,275 B2 | 9/2023 | Sedwick et al. | |
| 11,777,700 B2 | 10/2023 | Yu et al. | |

(Continued)

*Primary Examiner* — Michael K Phillips
(74) *Attorney, Agent, or Firm* — Polsinelli PC

(57) ABSTRACT

A satellite computer system for a satellite can include at least one processor programmed to perform one or more steps. The satellite includes a phased array antenna configured to communicate with terrestrial user equipment (UE) via a plurality of directional beams. The steps can include: determining a signal latency for each of the beams based on a distance between the satellite and a reference location within the beam footprint during a time period; determining, for each of the beams, a respective beam buffer-delay time, wherein the determined signal latency for the beam plus the respective beam buffer-delay time corresponds to a predetermined signal latency for the time period; and buffering an Rx data stream from the beams in a variable delay Rx buffer, wherein data in the Rx data stream from each beam of the plurality of beams is buffered for the respective buffer-delay time for the respective time period.

20 Claims, 12 Drawing Sheets

(56) References Cited

U.S. PATENT DOCUMENTS

| | | | | |
|---|---|---|---|---|
| 11,848,691 | B2 | 12/2023 | Yu et al. | |
| 12,123,966 | B2 | 10/2024 | Wu et al. | |
| 2002/0003776 | A1* | 1/2002 | Gokhale | H04Q 11/0478 370/467 |
| 2022/0018925 | A1 | 1/2022 | Duan et al. | |
| 2022/0116254 | A1 | 4/2022 | Wang et al. | |
| 2022/0255677 | A1 | 8/2022 | Zhu et al. | |
| 2023/0010816 | A1 | 1/2023 | Falkenberg | |
| 2023/0179990 | A1 | 6/2023 | Speidel et al. | |
| 2023/0188202 | A1* | 6/2023 | Arnaud | H04W 56/004 370/316 |
| 2023/0345341 | A1 | 10/2023 | Speidel et al. | |
| 2025/0047325 | A1 | 2/2025 | Lowenmark et al. | |
| 2025/0294514 | A1 | 9/2025 | Ji et al. | |

* cited by examiner

SYSTEMS AND METHODS FOR LATENCY EQUALIZATION IN A SATELLITE CELLULAR TELECOMMUNICATIONS NETWORK

CROSS REFERENCE TO RELATED APPLICATIONS

This application claims the benefit of and priority to U.S. Provisional Application No. 63/442,642 filed Feb. 1, 2023 and entitled SYSTEMS AND METHODS FOR LATENCY EQUALIZATION IN A SATELLITE CELLULAR TELECOMMUNICATIONS NETWORK, the entire contents of which are hereby incorporated herein.

TECHNICAL FIELD

The present technology pertains to using a group of satellites to provide cellular telecommunications base station services to terrestrial user equipment.

BACKGROUND

Terrestrial cellular telecommunication networks typically rely on Earth-based cellular towers for wireless communication in designated radio frequency bands with user equipment (for example, mobile phones, cellular-enabled computer devices, and the like). The Earth-based cellular towers implement a radio access network (RAN) that links the user equipment to functionality for handling voice calls and SMS messages and providing Internet connectivity, for example. However, communications coverage by Earth-based cellular towers is limited or unreliable in some areas, particularly (but not only) in less developed regions of the world.

The use of satellites to provide cellular telecommunication links to terrestrial user equipment has been proposed. However, the accepted telecommunications standards implemented by off-the-shelf user equipment are designed for conditions that include stationary, terrestrial base station hardware, and thus the user equipment can operate successfully within only a limited range of signal propagation latency and Doppler shift between the user equipment and the base station hardware. The relative position and velocity of satellites passing in range of the user equipment fall well outside this limited range of signal propagation latency and Doppler shift. Significant processing on a per-user equipment basis is required to correct for these non-standard signal properties in a way that would enable the satellites to implement a RAN for off-the-shelf terrestrial user equipment. However, processing capability on-board the satellites is limited due to limits on satellite size, power and heat management, and launch weight. Known proposals for the use of satellites to provide cellular telecommunication links to terrestrial user equipment have not successfully met these processing challenges, particularly in a way that scales well to processing signals from hundreds or thousands of user equipment per satellite.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

This disclosure provides new approaches to the use of a satellite telecommunications system to provide cellular telecommunication links to terrestrial user equipment. The satellite telecommunications system uses a group of satellites in low Earth orbit (LEO) to provide a radio access network to user equipment. Each satellite is equipped with one or more dedicated computer processors programmed to improve the handling of signal propagation latency between the satellite and the terrestrial user equipment in a fashion that enables the terrestrial user equipment to operate under standard radio access network (RAN) protocols designed for terrestrial base stations, while streamlining and simplifying the processing carried out at the satellite in a way that scales appropriately to large numbers of user equipment.

In accordance with an embodiment of the present disclosure, a satellite computer system for a satellite is provided. The satellite includes a phased array antenna configured to send and receive signals to terrestrial user equipment (UE) on a radio access network (RAN) via a plurality of directional beams, each of the beams having a beam footprint that defines a cell of the RAN. The satellite computer system includes at least one processor in communication with a memory, the memory storing computer-readable instructions that are executable to cause the at least one processor to perform steps that can include one or more of: determining, for a plurality of time periods, a signal latency for each of the plurality of beams, the signal latency based on a distance between the satellite and a reference location within the beam footprint during the time period; determining, for each of the plurality of beams for each of the time periods, a respective beam buffer-delay time, wherein the determined signal latency for the beam plus the respective beam buffer-delay time for the beam corresponds to a predetermined signal latency for the time period, the predetermined signal latency for each period being greater than or equal to a longest signal latency among the plurality of beams for the time period; and buffering an Rx data stream from the plurality of beams during each of the plurality of time periods in a variable delay Rx buffer, wherein data in the Rx data stream from each beam of the plurality of beams is buffered for the respective buffer-delay time for the respective time period.

In accordance with another embodiment of the present disclosure, a method of operating a satellite computer system of a satellite is provided. The satellite includes a phased array antenna configured to send and receive signals to terrestrial user equipment (UE) on a radio access network (RAN) via a plurality of directional beams, and each of the beams has a beam footprint that defines a cell of the RAN. The satellite computer system includes at least one processor. The method can include steps including one or more of: determining, for a plurality of time periods, a signal latency for each of the plurality of beams, the signal latency based on a distance between the satellite and a reference location within the beam footprint during the time period; determining, for each of the plurality of beams for each of the time periods, a respective beam buffer-delay time, wherein the determined signal latency for the beam plus the respective beam buffer-delay time for the beam corresponds to a predetermined signal latency for the time period, the predetermined signal latency for each period being greater than or equal to a longest signal latency among the plurality of beams for the time period; and buffering an Rx data stream from the plurality of beams during each of the plurality of time periods in a variable delay Rx buffer, wherein data in the Rx data stream from each beam of the plurality of beams is buffered for the respective buffer-delay time for the respective time period.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
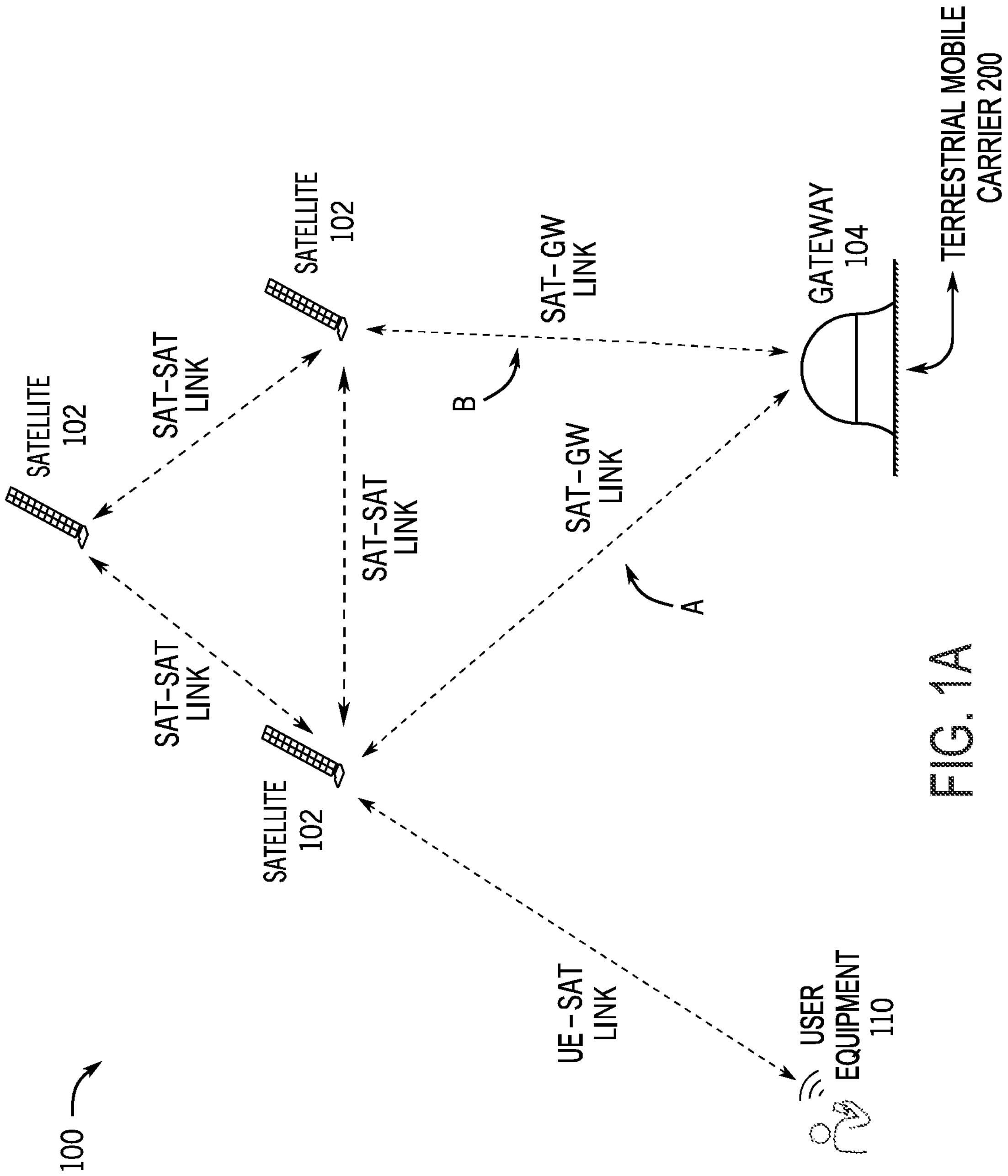
FIG. 1A illustrates a simplified schematic of an exemplary satellite telecommunications system in accordance with embodiments of the present disclosure.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment. Such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Elements of a Satellite Telecommunications System

Figure 1B:
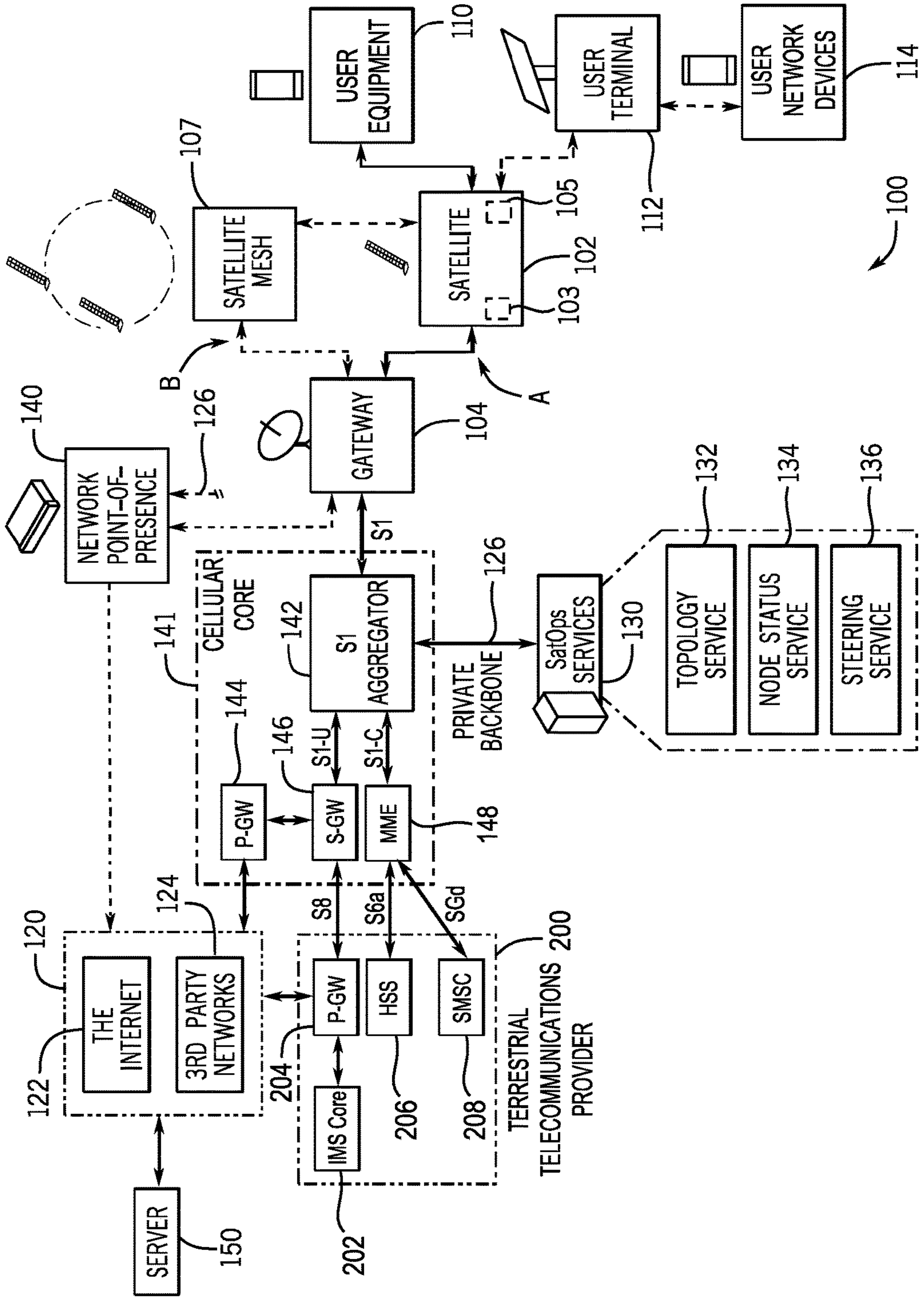
FIG. 1B illustrates a simplified block diagram of the satellite telecommunications system of FIG. 1A in accordance with embodiments of the present disclosure.

FIG. 1A is a simplified schematic, and FIG. 1B is a simplified block diagram, of elements of an exemplary satellite telecommunications system 100 in communication with user equipment (UE) 110. UE 110 may be any device that is capable of communicating with a standard terrestrial cellular phone tower and base station via a radio access network (RAN). For example, UE 110 may be an off-the-shelf mobile phone or other device implementing the 4G LTE communication standard. Alternatively, UE 110 may implement another standard compatible with terrestrial cellular service, such as but not limited to the 5G NR standard.

The satellite 102 provides a base station platform, in lieu of a conventional terrestrial cell phone tower and base station, for communicating with the UE 110. The base station platform provided by the satellite 102 includes both hardware and processing capability sufficient to implement the base station platform in a fashion that enables direct communication with the UE 110, with no hardware or software modifications required for standard-compliant UE 110. For example, in an embodiment in which the RAN is implemented using the 4G LTE standard, the satellite 102 hosts an Evolved Node B (eNodeB) platform.

UE 110 may establish a wireless UE-SAT link with one of the satellites 102 using a standard random access protocol of the RAN within a radio frequency (RF) band allocated for cellular communications. The cellular RF band may be allocated directly to the satellite telecommunications system 100 by a regulatory jurisdiction in which the UE 110 is located, or may be sub-allocated to the satellite telecommunications system 100 by the terrestrial telecommunications provider 200. For example, each of the satellites 102 may include one or more phased array antennas 105 (shown in FIG. 7A) for transmitting and receiving RF signals in the cellular RF band. In some embodiments, the phased array antenna 105 may include separate antenna arrays for transmitting and for receiving. Alternatively, the phased array antenna 105 may be implemented with transmitting and receiving performed by a same antenna array. In addition, the UE 110 may include a standard antenna (not shown) for off-the-shelf terrestrial user equipment, such as, for example, an internal Global System for Mobile Communication (GSM) antenna, for transmitting and receiving RF signals in the cellular RF band. However, other types of communication links are also contemplated for implementing the UE-SAT link.

The elements of the satellite telecommunications system 100 are capable of communication with each other via a mesh topology. The term "mesh topology" refers to the configuration of the elements as nodes in a mesh network. The various nodes in the mesh network coordinate with one another to efficiently route data in order to respond to requests for user data. As will be discussed in more detail herein, the configuration of the nodes in the mesh topology changes dynamically in satellite telecommunications system 100 to account for factors such as the motion of the satellites 102 relative to the Earth's surface and, in some cases, relative motion among the satellites 102. For example, as part of the network mesh topology of the satellite telecommunications system 100, certain satellites 102 may communicate directly with each other in a satellite mesh topology 107.

In addition to the satellites 102, the satellite telecommunications system 100 also includes a gateway terminal 104 on Earth. Each satellite 102 includes an onboard satellite computer system 103 programmed to manage communications with UE 110, gateway terminals 104, and other satellites 102, using one or more antennas (e.g., RF antennas and/or laser communication terminals) of the satellite. In particular, the satellite computer system 103 routes communications to and from UE 110, and to and from other nodes of the system, through the respective satellite 102 as part of the network mesh topology.

In some embodiments, in addition to providing cellular telecommunications service to UE 110, the satellite telecommunications system 100 may simultaneously provide Internet Protocol (IP) network connectivity to user terminals 112 that include a system-specific antenna. User terminals 112 may be installed at a house, a business, a vehicle (e.g., a land-, air-, or sea-based) vehicle, or another Earth-based location where a user desires to obtain communication access or Internet access via the satellites 102. An Earth-based user terminal 112 may be a mobile or non-mobile terminal connected to Earth or as a non-orbiting body positioned near Earth. For example, an Earth-based user terminal 112 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon, or a mobile object, such as an automobile or an airplane.

For example, the user may connect one or more network devices 114 such as desktop computers, laptops, mobile devices, Internet of Things (IoT)-enabled devices, and the like (collectively, "customer equipment") locally to the user's user terminal 112 and obtain access via satellites 102 to the Internet. Although the local connection between the customer equipment and the user terminal is illustrated as a WiFi router 118 (or more broadly a WiFi mesh), other types of wired or wireless local communication are also contemplated.

The gateway terminal 104 serves as a satellite access gateway for the satellite(s) 102 to communicate with one or more terrestrial telecommunications providers 200. Each terrestrial telecommunications provider 200 may be an independent operator of one or more standard Earth-based telecommunications networks. In the exemplary embodiment, satellite telecommunications system 100 has no native users, but instead provides service solely through roaming relationships with the one or more terrestrial telecommunications providers 200. In other words, UE 110 are not registered and authorized directly for use on the satellite telecommunications system 100, but are registered and authorized for use on the terrestrial telecommunications provider 200 and may connect via the satellite telecommunications system 100 when connectivity to the Earth-based cellular towers associated with the terrestrial telecommunications provider 200 is unavailable or unreliable. However, embodiments are also contemplated in which the satellite telecommunications system 100 provides cellular services directly to native users, without interfacing through an independent terrestrial telecommunications provider 200.

The gateway terminal 104 may be connected to a cellular core 141 of the satellite telecommunications system 100. The cellular core 141 may be hosted at one or more terrestrial locations which may be connected to a terrestrial private network, referred to as a "private backbone" 126, of the satellite telecommunications system 100. In the exemplary embodiment, the private backbone 126 may be implemented on an Internet-based secure cloud platform, such as Microsoft Azure® or Amazon Web Services® (AWS) by way of non-limiting examples. However, other implementations of the private backbone 126 are also contemplated. For example, a dedicated cellular core 141 may be assigned to each gateway terminal 104, and may be physically wired to the gateway terminal 104. In some cases, multiple gateway terminals 104 at a same site can be connected to a same cellular core 141. Additionally or alternatively, different gateway terminals 104 at a same site can be connected to different cellular cores 141. In some embodiments, an instance of the cellular core 141 is co-located with each gateway terminal 104.

In the exemplary embodiment, the cellular core 141 hosts an aggregator node 142 that provides an interface between the satellites 102 and the core telecommunications functionality of the satellite telecommunications system 100. For example, in a 4G LTE implementation, the cellular core 141 includes Evolved Packet Core (EPC) functionality. More specifically, each satellite 102 functions as an eNodeB, and the aggregator node 142 provides an S1 interface between the eNodeBs on multiple satellites 102 and the EPC functionality. In the example, the cellular core 141 may include one or more of a Packet Data Network Gateway (P-GW) 144 of the EPC, a user plane interface S1-U to a Serving Gateway (S-GW) 146 of the EPC, and a control plane interface S1-C to a mobility management entity (MME) 148 of the EPC. It is contemplated that the cellular core 141 may provide additional or alternative core functionality, and the aggregator node 142 may provide other suitable interfaces to multiple satellites, either in a 4G LTE implementation or other RAN implementations.

In the exemplary embodiment, the P-GW 144 provides a point-of-presence on one or more ground-based IP networks 120, such as the Internet 122 or another ground-based IP network 124. For example, the "other" type of ground-based IP network 124 may represent a limited access third-party network, such as but not limited to a cloud computing data center. P-GW 144 may allocate IP addresses to the UE 110 and enable the cellular core 141 to access data from the ground-based IP network 120 (e.g., from one or more servers 150) and provide the data back through the satellite telecommunications system 100 to the UE 110.

In the exemplary embodiment, S-GW 146 provides an interface to a separate P-GW 204 of the terrestrial telecommunications provider 200. For example, in a 4G LTE implementation, the interface is an S8 interface. P-GW 204 of the terrestrial telecommunications provider 200 may cooperate with an IP Multimedia Subsystem (IMS) core 202 of the terrestrial telecommunications provider 200 to enable the terrestrial telecommunications provider 200 to independently provide UE 110 with access to the one or more ground-based IP networks 120 (such as the Internet 122). Each terrestrial telecommunications provider 200 may make arrangements with the satellite telecommunications system 100 as to whether, and in what circumstances, to provide IP network access to the UE 110 via P-GW 144 as opposed to via P-GW 204.

In the exemplary embodiment, MME 148 provides an interface to a Home Subscriber Server (HSS) 206 of the terrestrial telecommunications provider 200. For example, in a 4G LTE implementation, the interface is an S6a interface. The HSS 206 is a database including subscription information of UE 110 with the terrestrial telecommunications provider 200, as well as other information regarding UE 110.

In the exemplary embodiment, MME 148 also provides an interface to a Short Message Service Center (SMSC) 208 of the terrestrial telecommunications provider 200. For example, in a 4G LTE implementation, the interface is an SGd interface. The SMSC 208 routes text messages to and from UE 110.

The communication signal paths in the satellite telecommunications system 100 may also include a link between the user terminal 112 and one of the satellites 102 in the mesh, which may be referred to as a UT-SAT link. In the exemplary embodiment, the UT-SAT link is implemented as a Ku-band radio frequency (RF) link. For example, the user terminal 112 and each of the satellites 102 may include one or more phased array antennas for transmitting and receiving RF signals in the Ku band. In the exemplary embodiment, the phased array antenna used by the satellite 102 for communicating with the user terminals 112 is a separate antenna from the phased array antenna 105 used by the satellite 102 for communicating with the UE 110. However, other types of communication links are also contemplated for implementing the UT-SAT link, for example, other bands or other types of links including optical links. Moreover, while only one user terminal 112 and three satellites 102 are illustrated, satellite telecommunications system 100 may include millions of user terminals 112 and many thousands of satellites 102, and different ones of the user terminals 112 and satellites 102 may use different types of communication links to establish the UT-SAT link.

The illustrated communication signal paths in the satellite telecommunications system 100 include a link between the satellite 102, or one of the satellites 102 in the mesh, and the gateway terminal 104, which may be referred to as a SAT-GW link. In the exemplary embodiment, the SAT-GW link is implemented as a Ka-band radio frequency (RF) link. For example, the gateway terminal 104 and each of the satellites 102 may include a parabolic antenna for transmitting and receiving RF signals in the Ka band. However, other types of communication links are also contemplated for implementing the SAT-GW link. For example, the satellites 102 may also include laser communication terminals, as described below, and the gateway terminal 104 may also include one or more laser communication terminals for communication with the satellites 102 when atmospheric weather conditions are favorable for ground-to-space (and space-to-ground) laser transmission. It should be understood that the gateway terminals 104 can include multiple antennas in any combination of parabolic antennas, laser communication terminals, or other type of communication links. Moreover, while only one gateway terminal 104 and three satellites 102 are illustrated, satellite telecommunications system 100 may include hundreds of gateway terminals 104 and many thousands of satellites 102, and different ones of the gateway terminals 104 and satellites 102 may use different types of communication links to establish the SAT-GW link.

The illustrated communication signal paths in the satellite telecommunications system 100 may further include links between respective pairs of the satellites 102 in the satellite mesh topology 107, which may be referred to as SAT-SAT links. In the exemplary embodiment, the SAT-SAT links are implemented as optical frequency links, or simply "optical" or "laser-based" links. For example, each of the satellites 102 also includes one or more laser communication terminals for transmitting and receiving laser-based (e.g., optical) signals. The laser communication terminals may be dynamically oriented with respect to the satellite 102 on which they are mounted to enable the laser communication terminals of each satellite 102 to track, and maintain the SAT-SAT links 106 with, other satellites 102 in relative motion with respect to the satellite 102. In the exemplary embodiment, each of the satellites 102 includes multiple laser communication terminals that may be independently oriented to enable each satellite to simultaneously maintain SAT-SAT links with multiple other satellites 102. However, other types of communication links are also contemplated for implementing the SAT-SAT links. Moreover, while only three satellites 102 are illustrated, satellite telecommunications system 100 may include many thousands of satellites 102, and different pairs of the satellites 102 may use different types of communication links to establish the respective SAT-SAT link between them. Additionally, one or more of the satellites 102 may not be configured to establish SAT-SAT links with other satellites 102.

In some instances, communications between the UE 110 and the cellular core 141 may be routed through a particular satellite 102 via a UE-SAT link, and through that same satellite directly to and from the gateway terminal 104 via a SAT-GW link, as shown in path A, without being routed through any other satellites 102. In other words, in some instances it is not necessary for the satellite 102 to utilize or maintain SAT-SAT links with other satellites, or even to be capable of establishing SAT-SAT links with other satellites, for the satellite telecommunications system 100 to route communications between the UE 110 and the gateway terminal 104. In other instances, communications between the cellular core 141 and the UE 110 having a UT-SAT link with the particular satellite 102 may be routed through a different satellite 102 that has established a SAT-GW link with the gateway terminal 104, as shown in path B, using one or more SAT-SAT links between the satellites 102 in the satellite mesh topology 107.

In the exemplary embodiment, satellite telecommunications system 100 also includes satellite operations ("SatOps") services 130 connected to the cellular core 141 from a centralized location. In the exemplary embodiment, the cellular core 141 is connected to the centralized SatOps services 130 via the private backbone 126. The SatOps services 130 may transmit various operational and management instructions to the cellular core 141 and the gateway terminal 104, as well as to the satellites 102 (via the gateway terminal). The SatOps services 130 may transmit various operational and management instructions to the cellular core 141.

The gateway terminal 104 may also be connected to a point-of-presence (POP) 140 on the one or more ground-based IP networks 120. For example, a dedicated PoP 140 may be assigned to each gateway terminal 104, and may be physically wired to the gateway terminal 104. In some cases, multiple gateway terminals 104 at a same site can be connected to a same PoP 140. Additionally or alternatively, different gateway terminals 104 at a same site can be connected to different PoPs 140. The POP 140 may access data from the ground-based IP network 120 (e.g., from one or more servers 150) and provide the data back through the satellite telecommunications system 100 to the user terminal 112 and network device 114. In the exemplary embodiment, each gateway terminal 104 is associated with a corresponding PoP 140, and the POP 140 is connected to the centralized SatOps services 130 via the private backbone 126. The SatOps services may transmit various operational and management instructions to the gateway terminal 104, as well as to the satellites 102 (via the gateway terminal) and to the user terminals 112 (via the gateway terminal and the satellites).

In some embodiments, the POP 140 corresponding to each gateway terminal 104 may be implemented on a common hardware platform with the cellular core 141 corresponding to that gateway terminal 104. However, separate hardware implementations of the POP 140 and the cellular core 141 are also contemplated.

Satellite Constellation

For global coverage having reduced latency, satellite telecommunications system 100 employs non-geostationary satellites, and more specifically low-Earth orbit (LEO) satellites 102. Geostationary-Earth orbit (GEO) satellites orbit the equator with an orbital period of exactly one day at a high altitude, flying approximately 35,786 km above mean sea level. Therefore, GEO satellites remain in the same area of the sky as viewed from a specific location on Earth. In contrast, LEO satellites orbit at a much lower altitude (typically less than about 2,000 km above mean sea level), which reduces Earth-satellite signal travel time and therefore reduces communication latency relative to GEO satellites.

However, a stable low-Earth orbit necessarily corresponds to a much shorter orbital period as compared to GEO satellites. For example, at a particular altitude, a LEO satellite 102 may orbit the Earth, for example, once every 95 minutes. Further in the exemplary embodiment, the low-Earth orbits of satellites 102 are prograde. Therefore, LEO satellites do not remain stationary relative to a specific location on Earth, but rather advance generally eastward with respect to the Earth's surface. In addition, the lower orbital altitude means that, as compared to a GEO satellite, a LEO satellite has a more limited line of sight. For example, a LEO satellite in an equatorial orbit would not have a "line of sight" for direct communication with user terminals or gateway terminals at middle or upper latitudes on Earth, such as at locations L1 (corresponding to Los Angeles, California) and L2 (corresponding to Seattle, Washington) identified in FIG. 2.

Figure 2:
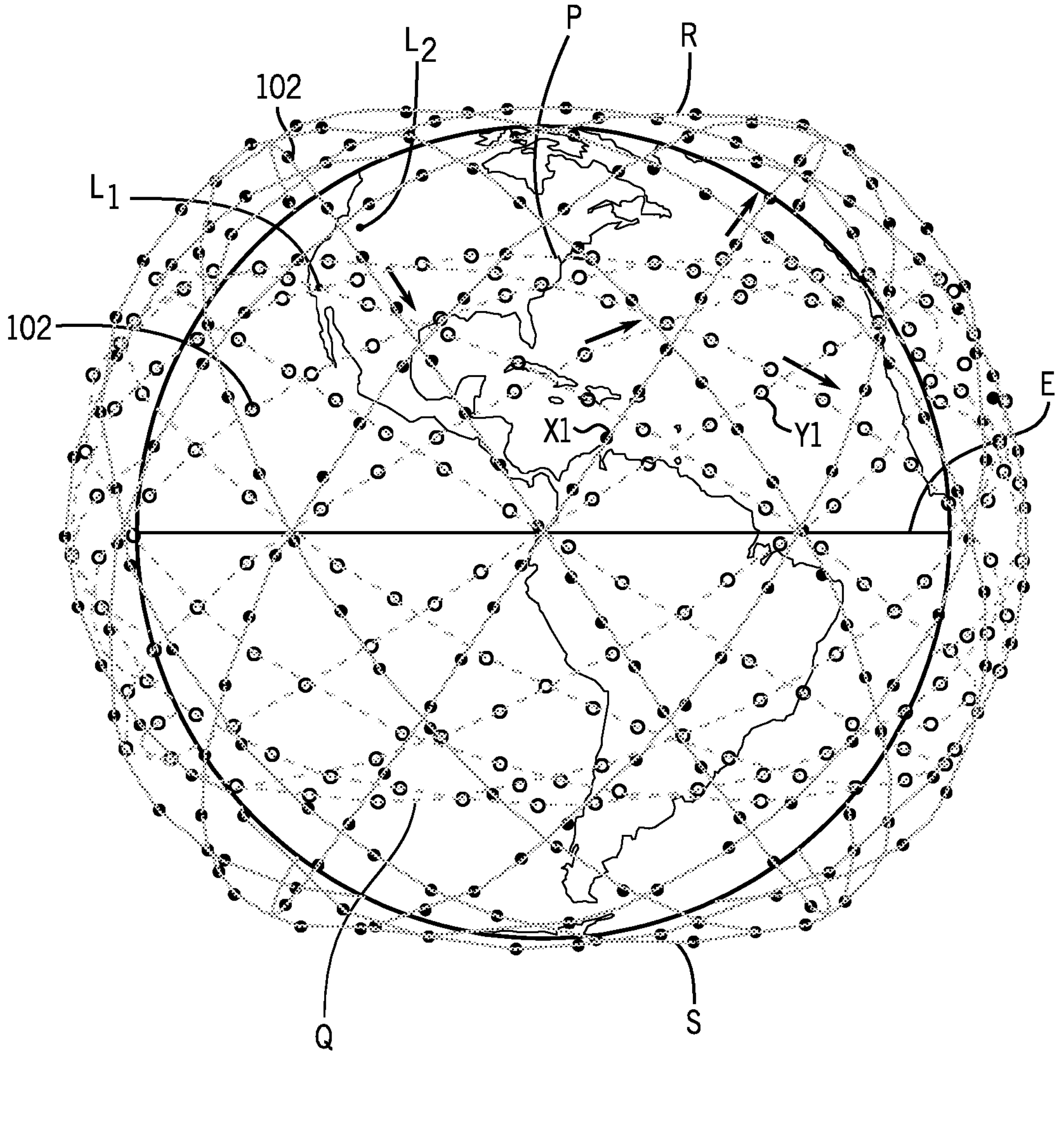
FIG. 2 is a schematic showing exemplary planar orbital patterns of a group of satellites, which may be used in the satellite telecommunications system of FIG. 1A, around a rotating Earth in accordance with embodiments of the present disclosure.

Accordingly, satellite telecommunications system 100 may include a large number, for example several thousand, satellites 102 arranged in a constellation of inclined orbits that ensures that at least some satellites 102 are always crossing the sky within range of user terminals 112 at any given Earth latitude and longitude. One non-limiting embodiment is illustrated in FIG. 2, which is a schematic showing an example of satellite planar orbital patterns X1 and Y1 of satellites 102 around a rotating Earth. In FIG. 2, the satellites in pattern X1 are represented by closed circles, and the satellites in pattern Y1 are represented by open circles, with arrows illustrating a general direction of travel of the satellites in each string. Each satellite string may include a number of equally spaced or substantially equally spaced satellites 102. More specifically, in a frame that rotates with the Earth, satellites 102 in the first string X1 are in discrete orbits sharing a first inclination, and satellites 102 in the second string Y1 are in discrete orbits sharing a second inclination different from the first inclination.

The angle of inclination of the satellites typically corresponds to an upper and lower limiting Earth latitude (indicated as P and Q for satellite string X1, and as R and S for satellite string Y1) of the orbital paths of the satellites. Although two strings at different inclinations are illustrated, other numbers of strings, such as one string or more than two strings, are also contemplated. Moreover, the illustrated angles of inclination are examples, and other angles of inclination for a single string or for multiple strings are also contemplated. Orbital patterns X1 and/or Y1 may be designed as repeating ground track systems, or may have a drifting pattern relative to the Earth's rotation rate.

Due to the inclination of the orbits, in addition to the general eastward motion of the satellites relative to the Earth's surface, each satellite 102 spends half its orbital period ascending from south to north over the Earth's surface, and the other half of its orbital period descending from north to south.

Ground Terminal Mesh Topology

Figure 3:
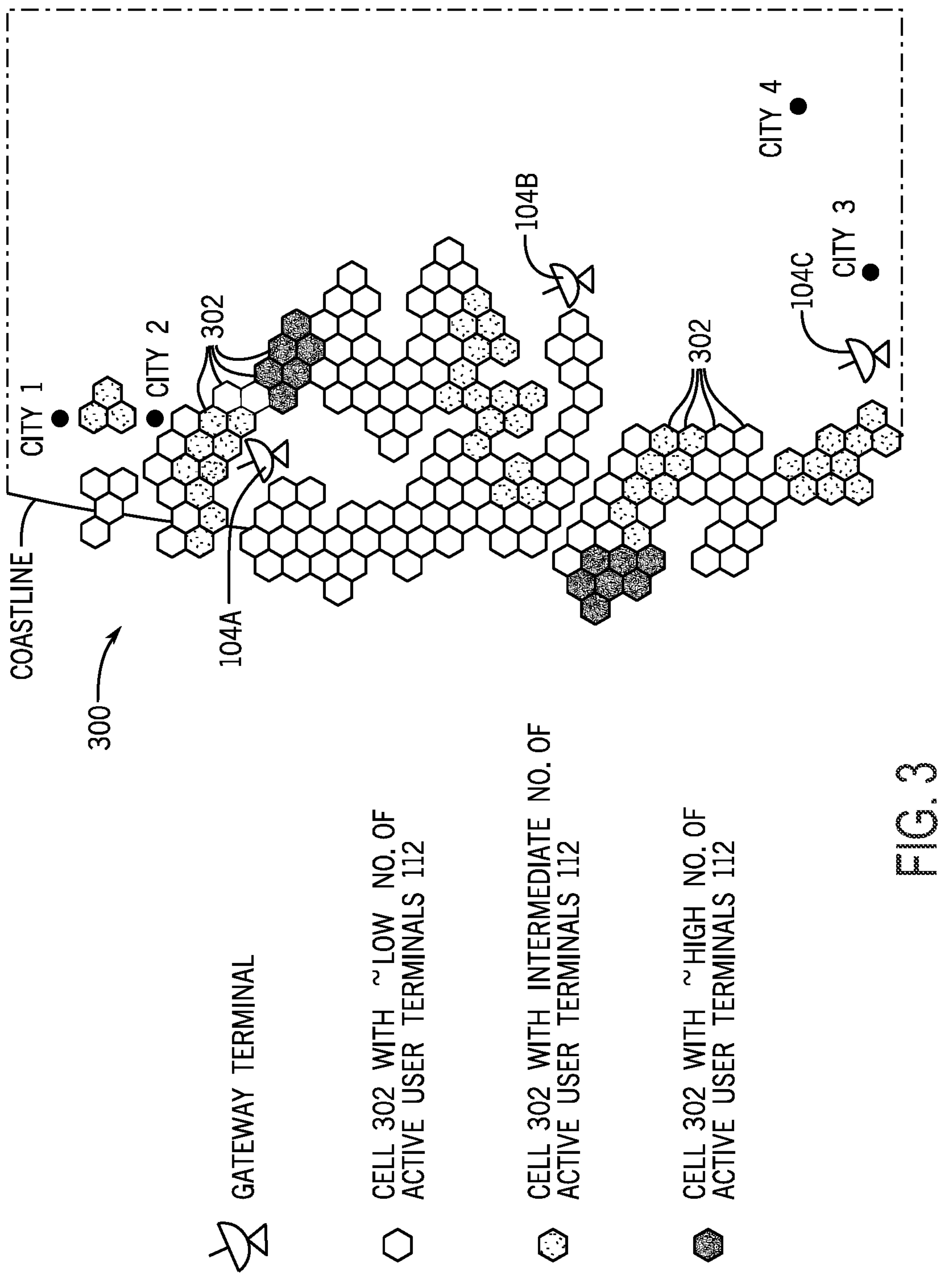
FIG. 3 illustrates a not-to-scale aerial view of an exemplary ground area that may be provided Internet service by the satellite telecommunications system of FIG. 1A, including user terminals grouped into Internet service cells, and gateway terminals.
Figure 4:
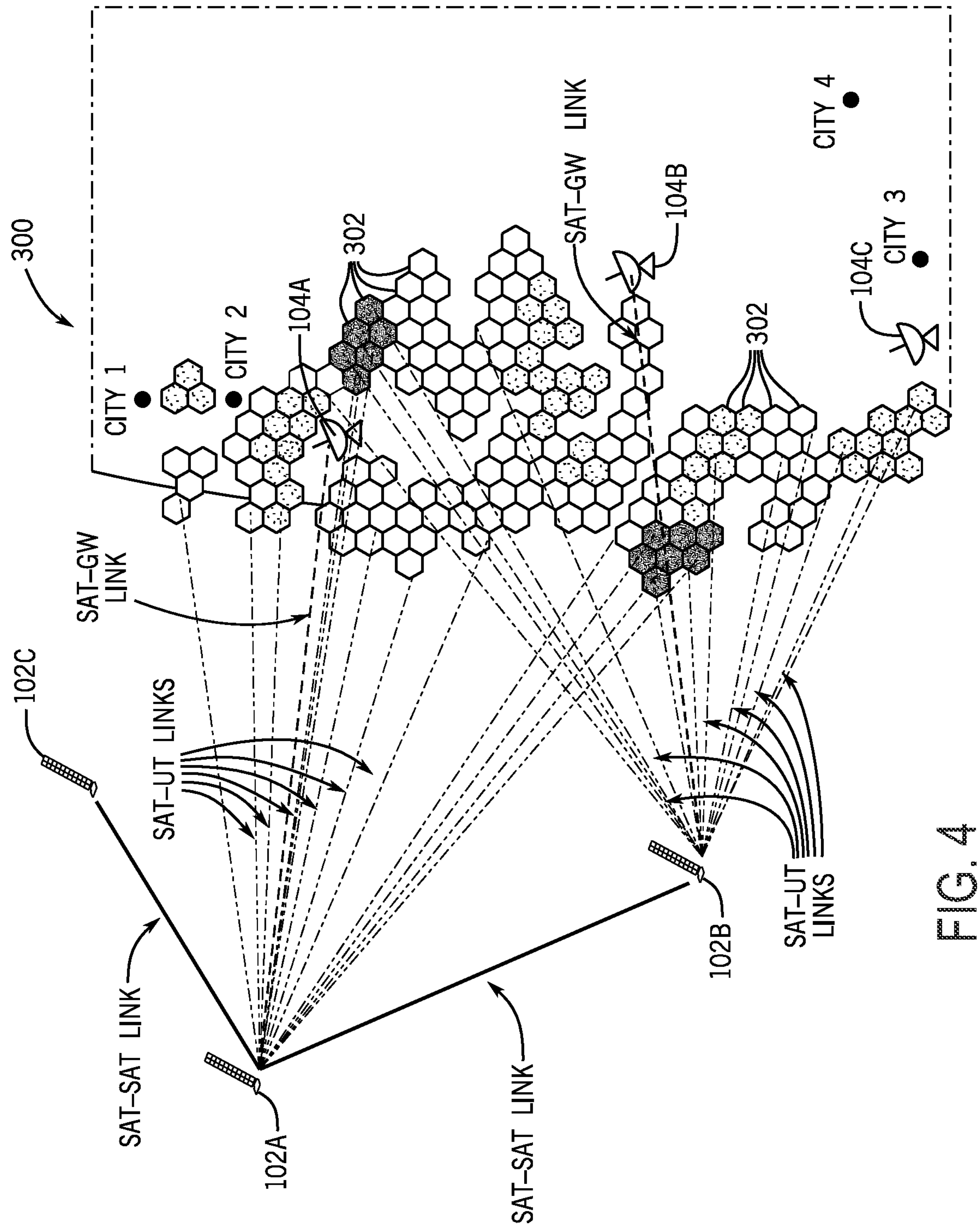
FIG. 4 illustrates a not-to-scale aerial view of the ground area shown in FIG. 3 being serviced by certain exemplary satellites of the group in communication with the user terminals and the gateway terminals.
Figure 5:
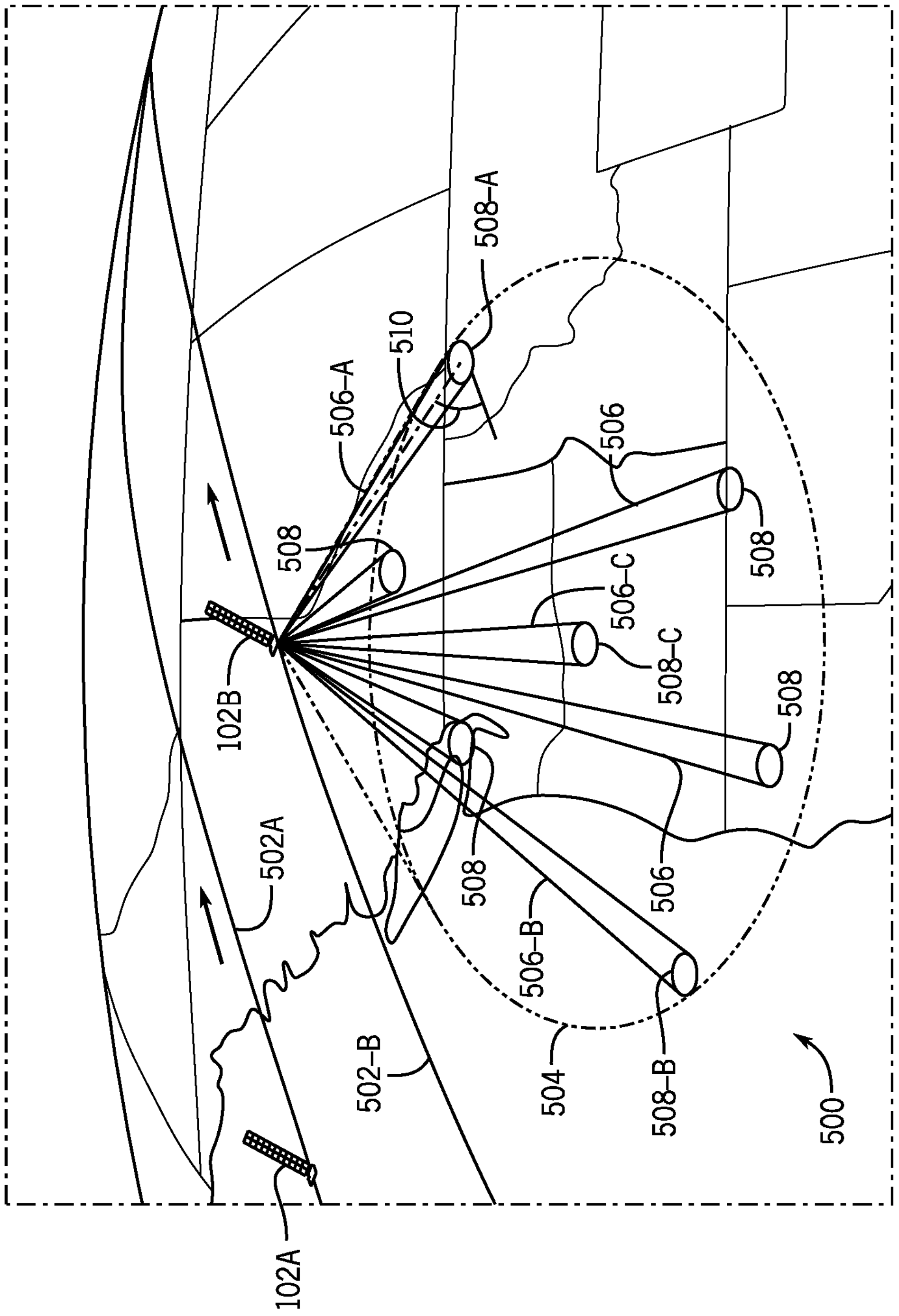
FIG. 5 illustrates a not-to-scale aerial view of an exemplary ground area that may be provided cellular communications service by the satellite telecommunications system of FIG. 1A, including beams and beam footprints of one of the satellites, in accordance with embodiments of the present disclosure.

FIG. 3 illustrates a not-to-scale aerial view of an exemplary ground area 300 that may be serviced by the satellite telecommunications system 100. More specifically, the ground area 300 may include a number of user terminals 112 that may transmit requests for user data to be serviced ultimately by, e.g., server 150 (shown in FIG. 1B) or other data sources on the ground-based IP network 120. The requests for user data, and the data responsive to the requests, may be routed to and from the user terminals via the POP 140 through the network topology of the satellite telecommunications system 100. FIG. 4 illustrates a not-to-scale aerial view of requests from, and responses to, ground area 300 via the ground-based IP network 120 being serviced by example satellites 102A, 102B, and 102C of the group of satellites 102 in communication with example gateway terminals 104A, 104B, and 104C. FIG. 5 illustrates a not-to-scale aerial view of an exemplary ground area 500 that may simultaneously be provided cellular communications service via the cellular core 141 of the satellite telecommunications system 100, including representative beams 506 and beam footprints 508 of one of the satellites 102. For example, access to the cellular core 141 may be provided to UE 110 via a first phased array antenna carried by at least a subset of the satellites 102, and access to the ground-based IP network 120 may be simultaneously provided to the user terminals 112 via a second phased array antenna carried by the satellites 102 that is physically separate from the first phased array antenna. However, embodiments are also contemplated in which the satellite telecommunications system 100 provides cellular communications service to UE 110 via the cellular core 141, but does not support separate access to the ground-based IP network 120 by user terminals 112 via the POP 140.

The network topology of the satellite telecommunications system 100 may be analogized to a map of roads (travel routes) interconnecting a group of cities (nodes). For road travel between two cities separated by a significant distance, several different road routes may be available, each using roads that connect a different set of intermediate cities. One must know which intermediate cities are connected by roads, and how much traffic there will be on each road, in order to select the best travel route between the two cities.

Similarly, for data travel between two nodes in the satellite telecommunications system 100 (e.g., between a UE 110 and a terrestrial telecommunications provider 200, or between a user terminal 112 and a data source on the ground-based IP network 120 (shown in FIG. 1B)), several different network routes may be available, each using links that connect a different set of intermediate nodes (i.e., satellites and gateways). One must know which satellites are within the field of view of the UE 110 or user terminal 112, which satellites and gateways are connected by data links, and how much traffic there will be on each link, in order to select the best data route between the UE and the cellular core 141 or between the user terminal and the POP 140. The topology of the satellite telecommunications system 100 is more complex than a road map, however, because the "roads" (data communication routing through the mesh topology) must be frequently reconfigured to accommodate the relative motion of the satellites 102 with respect to the UE 110 and the ground terminals 112 and 104, and in some cases the relative motion of the satellites 102 with respect to each other. In some embodiments, the reconfiguration must occur once or more per minute to accommodate the relative motion of the satellites 102.

With reference to FIGS. 3 and 4, in the exemplary embodiment, the ground area 300 includes user terminals 112 grouped into IP service cells 302 that are geographically fixed relative to the Earth. Although each IP service cell 302 is illustrated as a hexagonally shaped area, IP service cells 302 of any shape are contemplated. Moreover, although the IP service cells 302 are illustrated as having a particular size, other sizes of IP service cells 302 are contemplated. IP service cell size may be a function of multiple factors including, but not limited to, altitude of the satellite constellation, number of satellites in the satellite constellation, number of Earth-based user terminals, geography, etc. The ground area 300 also includes one or more gateway terminals 104.

In some embodiments, the user terminals 112 in each IP service cell 302 are further grouped into different network traffic "lanes" within the IP service cell 302. The lanes may be, but need not be, associated with particular geographical subregions within the IP service cell 302. Each combination of an IP service cell 302 and lane may be uniquely identified in the network addressing scheme utilized by the satellite telecommunications system 100, such that all user terminals 112 in a specific IP service cell and lane can be addressed as a group. For example, if the network addressing scheme is structured similar to Internet Protocol (IP) addressing, each IP service cell and lane may be associated with a unique network address prefix.

As noted above, a PoP 140 may be co-located with each gateway terminal 104. In some embodiments, each user terminal 112 is configured to address requests for user data to a particular PoP 140 on the ground-based IP network 120, which may be referred to as the "home" POP for the user terminal. In some embodiments, the user terminals 112 are assigned to a "home" PoP 140 on a per-service cell or per-lane basis. The home PoP 140 may be assigned based on a physical proximity of the service cell to the home PoP 140. The approach of assigning home PoPs based on geographic proximity tends to reduce a signal travel time through the satellite telecommunications system 100 for the requests for user data. However, other methods of assigning a "home" PoP 140 to each user terminal for the addressing of requests for user data are also contemplated. The home PoP 140 handles each request for user data by accessing resources on the ground-based network 120 or nodes of the satellite telecommunications system 100 to obtain the requested data, and by accessing the SatOps services 130 to obtain routing instructions for returning the requested data.

With reference to FIGS. 1-4, as a result of the motion of satellites 102 relative to the Earth's surface, a particular satellite 102 may be in a position to establish communication with the user terminals 112 in a particular IP service cell 302 for only a limited time window, such as less than ninety minutes, less than sixty minutes, less than thirty minutes, less than fifteen minutes, less than five minutes, or less than one minute. In the exemplary embodiment, the SatOps services 130 include a topology service 132 that assigns, to each IP service cell 302 (and in some embodiments to each lane within the IP service cell), one or more of the satellites 102 to be available for linking with the user terminals 112 on a slot-by-slot basis, in which each slot represents a period of time. The period of time, i.e., time slot length, may be selected to accommodate the limited time windows over which any particular satellite may be within the field of view of the user terminals in that IP service cell. Time slot length may be a function of orbital velocity of the satellite constellation (which in turn may be a function of altitude of the satellite constellation), number of satellites in the satellite constellation, size of the IP service cells, etc. In the exemplary embodiment, the time slot length is between 10 and 20 seconds inclusive. For example, each time slot may be 15 seconds long. However, other time slot lengths are also contemplated.

The topology service 132 may transmit topology schedule data to the user terminals 112 in each IP service cell 302 on a regular basis (e.g., via the gateway terminal 104 and the satellite 102 that are currently in communication with the IP service cell 302 associated with the respective user terminal 112). The topology schedule data transmitted to the user terminals specifies one or more of the satellites 102 that will be available for connectivity to the respective user terminal 112 during one or more future time slots. The topology schedule data may also include pointing instructions for the phased array antenna of the user terminal (or for the appropriate antenna for other types of UT-SAT links) needed to establish and maintain the corresponding UT-SAT link during the time slot, as derived from data provided by the node status service 134 for the relative motion of the satellite and the user terminal. In conjunction with the arrival of the future time slot, the user terminal 112 initiates a UT-SAT link with one of the satellites 102 specified by the topology schedule data for that time slot. In the exemplary embodiment, the SatOps services 130 also includes a steering service 136 that is programmed to manage the routing of the many data requests from, and responses to, user terminals 112 through the network topology of the satellite telecommunications system 100.

The timing of the regular transmission of the topology schedule data to the user terminals may be selected to balance several factors. For example, transmitting the topology schedule data for each time slot well in advance of the arrival of the future time slot helps to ensure that the topology schedule data propagates through the gateways and satellites to the user terminals in time to enable the user terminals to re-orient their respective phased array RF beams when the future time slot arrives. On the other hand, transmitting the topology schedule data for each time slot a relatively short time in advance of the arrival of the future time slot enables the topology service 132 to account for more up-to-date satellite and gateway statuses and ground demand data in assigning IP service cells to satellites. For example, the SatOps services 130 may include a node status service 134 that monitors the satellites 102 and gateway terminals 104. The node status service may provide projected satellite orbital positions during future time slots based on the position, velocity, and altitude of each satellite. The node status service may also provide data indicating Internet connectivity and performance of the PoP 140 associated with each gateway terminal 104, and/or data indicating weather-based signal attenuation prediction data for each gateway site. The node status service 134 may further evaluate the health and operability of each satellite and gateway, for example, by tracking a slew rate and alignment performance of each parabolic antenna of the satellite or gateway to determine a current capability of the parabolic antenna to establish and track links. Other types of health and/or status monitoring of the nodes in satellite telecommunications system 100 are also contemplated. The topology service 132 may be programmed to avoid assigning a potential link between nodes if the node status data suggests the link would be unreliable. Additionally or alternatively, the topology service 132 may be programmed to assign a reliability label to a link between nodes if some node status data suggests the link would be unreliable during one or more time slots, and to include the reliability label in data provided to the steering service 136, so that the steering service 136 can take the potential unreliability of the link into account for data routing decisions during the one or more time slots.

In some embodiments, the factors involved in advance transmission timing for the topology schedule data may be balanced advantageously by regularly transmitting the topology schedule data to the user terminals in each IP service cell at an advance transmission time of five to ten minutes in advance of the one or more future time slots associated with the topology schedule data. However, other advance transmission times are also contemplated.

As discussed above with respect to user terminals, a particular satellite 102 also may be in a position to establish communication with a particular gateway terminal 104 for only a limited time window. In the exemplary embodiment, the topology service 132 also assigns each satellite 102 to one of the gateway terminals 104 on the slot-by-slot basis. The topology service 132 may transmit topology schedule data to the gateway terminals and to the satellites on a regular basis (e.g., via the gateway terminal 104 that is currently in communication with the respective satellite 102). The topology schedule data specifies an expected connectivity between each gateway terminal 104 and one or more satellites 102 during one or more future time slots. The topology schedule data transmitted to each satellite 102 may also include pointing instructions for the parabolic RF antenna of the satellite (or for the appropriate antenna for other types of SAT-GW links), and likewise the topology schedule data transmitted to each gateway terminal 104 may also include pointing instructions for the parabolic RF antenna of the gateway terminal (or for the appropriate antenna for other types of SAT-GW links), needed to establish and maintain the corresponding SAT-GW link during the time slot, as derived from data provided by the node status service 134 for the relative motion of the satellite and the gateway terminal. In conjunction with the arrival of the future time slot, the satellite 102 initiates a SAT-GW link with the gateway terminal 104 specified by the topology schedule data for that time slot.

The timing of the advance transmission may be based on advance timing factors similar to those discussed above. For example, the satellites and gateways terminals may need to receive the topology schedule data sufficiently in advance of the future time slot to calculate and execute slewing of their respective parabolic RF antennas as required by the topology schedule data for that future time slot. In some embodiments, the advance transmission time for the topology schedule data to the satellites and the gateway terminals is five to ten minutes in advance of the one or more future time slots associated with the topology schedule data. However, other advance transmission times are also contemplated.

For example, as illustrated in FIG. 4, three satellites 102A, 102B, and 102C are approaching ground area 300 at the start of a particular time slot. The IP service cells 302 in the ground area have varying numbers of active user terminals 112. The user terminals 112 in each IP service cell 302 have previously received topology schedule data for the particular time slot, specifying satellites 102A, 102B, and 102C as being available for UT-SAT links during the particular time slot. Accordingly, in conjunction with the arrival of the time slot, the various user terminals 112 in ground area 300 establish respective links with satellite 102A, 102B, or 102C for communication with satellite telecommunications system 100.

In some embodiments, the topology schedule data specifies, on a per IP service cell 302 basis, a priority sequence in which the user terminals 112 should attempt to establish links with the available satellites 102A, 102B, and 102C. In other words, the topology schedule data sent to user terminals in some IP service cells may specify a priority of 102A, 102B, and 102C for attempts to establish links during the time slot, while the topology schedule data sent to user terminals in other IP service cells may specify a priority of 102B, 102A, and 102C for attempts to establish links during the time slot. Each user terminal 112 attempts first to establish a UT-SAT link with the first satellite in the priority sequence, and if unsuccessful, attempts to establish a UT-SAT link with the second satellite in the priority sequence, and so on. Although three satellites are listed in the example priority sequences above, other numbers of satellites in a priority sequence are also contemplated, and different IP service cells may be given different numbers of satellites in their priority sequences. In other embodiments, the topology schedule data merely identifies, on a per IP service cell 302 basis, a non-prioritized list of satellites that should be available to establish links, and each user terminal 112 is programmed to select for itself an order in which the user terminal will attempt to establish a link with each of the listed satellites. For example, the user terminal 112 may be programmed to apply an algorithm to the list of candidate satellites to select a particular satellite for attempting to establish a UT-SAT link. The algorithm may include a random element, and/or may rely on information stored locally by the user terminal 112, such as, but not limited to, a locally stored obstruction map.

In addition, in certain embodiments, a combination approach may be used. For example, the topology schedule data may identify a higher priority tier of multiple candidate satellites from among which the user terminal 112 can select first using its own local algorithm, and also a lower or de-prioritized tier of candidate satellites. The algorithm used by the user terminal 112 may be programmed to select one of the de-prioritized satellites only if the user terminal does not establish a satisfactory connection with any of the satellites in the higher priority tier.

In some embodiments, as described above, each IP service cell may be associated with one or more "lanes" of network traffic. The lanes may be characterized as virtual pathways defined by the network addressing scheme of the satellite telecommunications system 100, and the lane addresses may stay constant as the satellites physically serving the user terminals in the IP service cell change over time. In certain embodiments, each lane of the IP service cell is assigned on a slot-by-slot basis to be physically carried by one of the satellites listed in the topology schedule data provided to the user terminals in the IP service cell. For example, a particular IP service cell 302 may have multiple lanes of network traffic defined in the network addressing scheme of the satellite telecommunications system 100, and the number (and network identification) of the lanes may be maintained independently of any variation in the number of satellites listed in the topology schedule data for each time slot. As an illustration, an IP service cell may have three lanes of network traffic defined. If three satellites 102 are listed in the topology schedule data for that IP service cell in a first time slot, each of those three satellites may be assigned to physically carry a different one of the three lanes during the first time slot. If fewer than three satellites 102 are listed in the topology schedule data for that IP service cell in a second time slot, at least two of the lanes are assigned to be carried by the same satellite during the second time slot.

Because the user terminal 112 may independently determine which satellite to establish a UT-SAT link with, the SatOps services 130 does not know in advance which satellite 102 will be in communication with which user terminal 112. In some embodiments, each time a user terminal 112 successfully establishes a new UT-SAT link with one of the satellites 102, the SatOps services 130 associates, in a memory, the user terminal with the lane of network traffic corresponding to the current linked satellite. The SatOps services 130 provides that association as part of the network data to the steering service 136, to enable data routing through the proper current network lane back to the user terminal.

There may be several advantages in providing the user terminals 112 in each IP service cell 302 with more than one candidate satellite 102 for establishing a UT-SAT link during a given time slot. For example, for an IP service cell 302 that receives topology schedule data including a list of candidate satellites 102A, 102B, and 102C, some user terminals in that IP service cell may become blocked from communication with satellite 102A, as the satellite moves across the sky relative to the ground, by a local obstacle, such as a tree or building. The list of candidates in the topology schedule data enables the user terminal to quickly move to establish a link with the next candidate satellite during the same time slot. In addition, there may be an upper limit on the number of UT-SAT links that can be maintained by each satellite 102A, 102B, and 102C. For example, each satellite 102 may have a finite number of phased array antennas configured to receive a signal within an associated bandwidth, the bandwidth of each phased array antenna may be distributed among a finite number of signal channels, and the satellite 102 may be configured to decode a finite number of beams (e.g., beams from user terminals 112) within each signal channel. In some examples, the satellites 102 may each have from one to four receiving phased array antennas, each receiving phased array antenna may have from 4 to 24 channels, and the satellite may be configured to decode from 4 to 32 beams per channel. More or fewer beams per antenna, or more or fewer antennas per satellite, are also contemplated. Accordingly, some user terminals 112 in an IP service cell 302 with a relatively high number of active user terminals may be blocked from linking to one or more of the candidate satellites in the topology schedule data for a given time slot, because a number of other user terminals equal to the overall beam decoding capacity of the candidate receiving satellite have already established communications with the candidate receiving satellite. Again, the list of candidate satellites in the topology schedule data enables the blocked user terminal to quickly move to establish a link with the next candidate satellite during the same time slot. For these or similar reasons, even in embodiments where all user terminals in the same IP service cell 302 receive the same priority list of satellites for a particular time slot, user terminals in that IP service cell may switch lanes to establish UT-SAT links with different satellites during that time slot.

Similarly, the satellites 102A, 102B, and 102C have previously received topology schedule data for the particular time slot shown in FIGS. 3 and 4. The topology schedule data can specify, for each satellite, one of the gateway terminals 104A, 104B, and 104C for SAT-GW links during the particular time slot. Accordingly, in conjunction with the arrival of the time slot, the various satellites 102 establish respective SAT-GW links with gateway terminals 104A, 104B, and 104C for communication with satellite communication system 100.

Satellite Mesh Topology

The term "satellite mesh topology" refers specifically to the network interconnectivity among the group of satellites 102 as nodes within the overall mesh network, and the configuration of the satellite mesh topology 107 changes dynamically over time in the satellite telecommunications system 100 to account for relative motion among the satellites 102 and other factors.

One factor that affects the satellite mesh topology 107 is that each satellite 102 can only link directly to a limited number of other satellites 102 at any given time, due to each satellite 102 having a finite number of laser communication terminals (and/or other SAT-SAT communication devices). In other words, at any given time, each satellite 102 is capable of establishing a direct network connection to only a few other satellites 102 out of potentially thousands of satellites in the constellation. In one embodiment, each satellite 102 has five laser communication terminals available to link to other satellites 102. However, embodiments in which one or more of the satellites 102 has a different number of laser communication terminals (or a different number of other SAT-SAT communication devices) are also contemplated.

In the exemplary embodiment, the topology service 132 assigns SAT-SAT links among pairs of satellites 102 on the slot-by-slot basis. The topology service 132 may include the link assignments in the topology schedule data transmitted to each satellite 102 on the regular basis, as discussed above (e.g., via the gateway terminal 104 currently in communication with the respective satellite 102). More specifically, the topology schedule data may specify a connectivity of the respective satellite 102 to other satellites in the satellite mesh topology 107 during the one or more future time slots. The topology schedule data may also include pointing instructions for each of the satellite's laser communication terminals (or for the appropriate antenna for other types of SAT-SAT links) needed to establish and maintain the specified SAT-SAT links during the time slot, as derived from data provided by the node status service 134 for the relative motion of the pair of satellites. In conjunction with the arrival of the future time slot, the satellite computer system 103 dynamically establishes SAT-SAT links with the other satellites specified by the topology schedule data for that time slot, as well as the SAT-GW link with the gateway terminal 104 specified for that time slot.

As noted above, the topology service 132 may be programmed to transmit the SAT-SAT link topology schedule data to the satellites on the same regular basis, such as five to ten minutes in advance of the one or more future time slots, as is used to transmit general mesh topology schedule data to the nodes. However, other advance transmission times are also contemplated.

Cellular RF Beam Mapping

Returning to FIG. 5, as noted above, the satellites 102 may also provide cellular communications service to the ground area 500 via the cellular core 141 of the satellite telecommunications system 100. The ground area 500 may be co-extensive with, or overlap, the ground area 300 in which user terminals 112 are serviced. For example, access to the cellular core 141 may be provided to UE 110 via a first phased array antenna 105 (shown in FIG. 7A) carried by at least a subset of the satellites 102, and access to the ground-based IP network 120 may simultaneously be provided to the user terminals 112 via a second phased array antenna (not shown) carried by the satellites 102 that is physically separate from the first phased array antenna. Alternatively, the ground area 500 may not overlap with ground area 300 or may not include any user terminals 112 serviced by the satellites 102. In some embodiments, for example, the satellites 102 support access to the cellular core 141 by UE 110 in the ground area 500, but do not support separate access to the ground-based IP network 120 by user terminals 112.

In particular, in FIG. 5, satellites 102 A and 102B are moving generally northeast over the ground area 500 along respective orbital paths 502A and 502B, with the satellite 102A slightly behind and to the north of the satellite 102B. As shown in FIG. 4, three gateway terminals 104A, 104B, and 104C are available to establish SAT-GW links with the satellites 102A and 102B as they pass over the ground area 500, and each satellite 102A and 102B may establish a SAT-GW link for each time slot as directed by the topology schedule data.

In the exemplary embodiment, each of the satellites 102 implements a base station platform that supports multiple cells, and the carrier for each cell is implemented by a corresponding RF beam 506 of the phased array antenna 105. For example, in a 4G LTE implementation, the satellite base station platform is an eNodeB that supports up to 256 cells (also referred to as sectors), and the phased array antenna 105 (or, optionally, plurality of phased array antennas 105) of the satellite generates up to 256 separate directional RF beams 506 as the carriers for each cell (although only seven beams 506 are illustrated in FIG. 5 for clarity of illustration). However, other numbers of beams/cells per satellite 102 are also contemplated, either in a 4G LTE implementation or other RAN implementations. Each beam 506 intersects the surface of the Earth at a centerline incidence angle 510 and has a corresponding beam footprint 508 at or near the surface. The beam footprint 508 defines a service area of the cell, such that UE 110 in the beam footprint 508 are able to access the satellite telecommunications system 100 using the corresponding beam 506. The eNodeB implemented by the satellite routes communications with the UE 110 in each beam footprint through the satellite's current SAT-GW link and the cellular core 141, as shown in FIG. 1B.

As the satellite 102B passes over the ground area 500, the position of each UE 110 on the surface constantly changes relative to the position of the satellite 102B. In the exemplary embodiment, the topology service 132 of the SatOps services 130 includes a cellular planning component programmed to compensate for the relative motion of the satellites in order to ensure continued connectivity of the UE 110. For example, at the moment in time illustrated in FIG. 5, the satellite 102B has a field of regard 504, which is an area that the phased array antenna 105 can potentially reach with directional beams 506. The beams generated by the satellite include a forwardmost beam 506-A with a footprint 508-A, a rearmost beam 506-B with a footprint 508-B, and a nadir beam 506-C with a footprint 508-C. (Additional beams generated by the satellite are not illustrated in FIG. 5 for purposes of clarity of illustration.) As the satellite 102B moves onward, if there is no adjustment in the direction of emanation of the beams 506 from the satellite 102B, the beam footprint 508-A will move away from the UE 110 that were communicating via the beam 506-A, the beam footprint 508-B will move away from the UE 110 that were communicating via the beam 506-B, and the beam footprint 508-C will move away from the UE 110 that were communicating via the beam 506-C.

In some embodiments, in order to provide continued connectivity to the UE 110 in each geographic sub-area of the ground area 500, the beams 506 may be re-directed (that is, the beam angle from the phased array antenna 105 may be changed) to keep the footprint 508 on the same sub-area as the satellite 102B moves along the path 502. This may be referred to as “sliding” the beams. For example, the incidence angle 510 of the beam 506-A would steadily approach 90 degrees as the satellite 102 moves towards a position directly over the geographic sub-area covered by beam footprint 508-A in FIG. 5, and then continue to grow steadily past 90 degrees towards 180 degrees as the satellite moves away to the northeast, such that the beam footprint 508-A remains located on the same geographic sub-area throughout the pass through the satellite’s field of regard 504.

Additionally or alternatively, the beams 506 may be held at a constant beam angle from the phased array antenna as the satellite 102B moves overhead, and communication with the UE 110 may be handed over to a different beam 506 with a footprint 508 that moves over the geographic sub-area as the footprint of the initial beam leaves the sub-area. This may be referred to as “gliding” the beams. For example, the geographic sub-area initially covered by beam footprint 508-A (at the instant in time shown in FIG. 5) would eventually be covered by beam footprint 508-C as the satellite moves directly overhead, and then covered by beam footprint 508-B just before the geographic sub-region is left behind by the field of regard 504 as the satellite 102B moves away. (The geographic sub-area would also be covered by intermediate beam footprints 508 distributed between footprints 508-A and 508-C, and between 508-C and 508-B, associated with beams 506 that are not included in FIG. 5 for purposes of clarity of illustration.) The UE 110 in that geographic sub-area may be handed over to the next following beam in sequence as each successive beam footprint covers the sub-area. As the final footprint 508-B for the satellite leaves the geographic sub-area, the UE 110 in the sub-area may next be handed over to a beam of the next following satellite 102A in the group of satellites 102, and so forth.

In some gliding beam implementations, the satellites 102 may utilize one or more standard handover procedures associated with the RAN implementation to pass the UE 110 in the geographic sub-area from beam to beam as the satellites move overhead. For example, each beam originating from a satellite is a defined cell of the same base station platform, and handovers between beams of the same satellite 102 (i.e., intra-satellite handovers) may be accomplished without involvement of the cellular core 141. Likewise, the beams from different satellites communicating with the same cellular core 141 are defined as cells of the same RAN, and within-network handover procedures may be used. In a 4G LTE implementation, such handovers may be accomplished using the X2 or S1 interfaces.

In some embodiments, the topology service 132 may use a dynamic combination of sliding and gliding beams to meet requirements for cellular services requested by UE 110 within the ground area 500, under constraints imposed by the network topology considerations discussed above and, in some cases, by a concomitant need to meet independent data flow requirements to and from user terminals 112 using the same satellites 102 and gateway terminals 104. More specifically, the topology service 132 may allocate a direction and power of the available beams of the phased array antenna 105 of each satellite 102 on the slot-by-slot basis, as discussed above, to ensure coverage of active UE 110 in the geographic sub-areas within the field of regard 504 during the time slot. The topology planning service may also ensure that the network topology for the time slot includes sufficient backhaul capacity for cellular communications data from the satellites 102 through the gateway terminals 104 (potentially using the satellite mesh topology 107 as an intermediate link) to the cellular core 141. The topology service may transmit, via the gateway terminals 104, SAT-GW link instructions, SAT-SAT link instructions, and beam plan instructions for each time slot to the satellites 102 as part of the topology schedule data. The beam plan instructions may be used by the satellite computer system 103 to command the phased array antenna 105 to generate the beams 506 during each time slot in accordance with the beam direction and power allocations determined by the topology service 132.

Satellite Effects on Cellular Signal Latency and Doppler Shift

Figure 6:
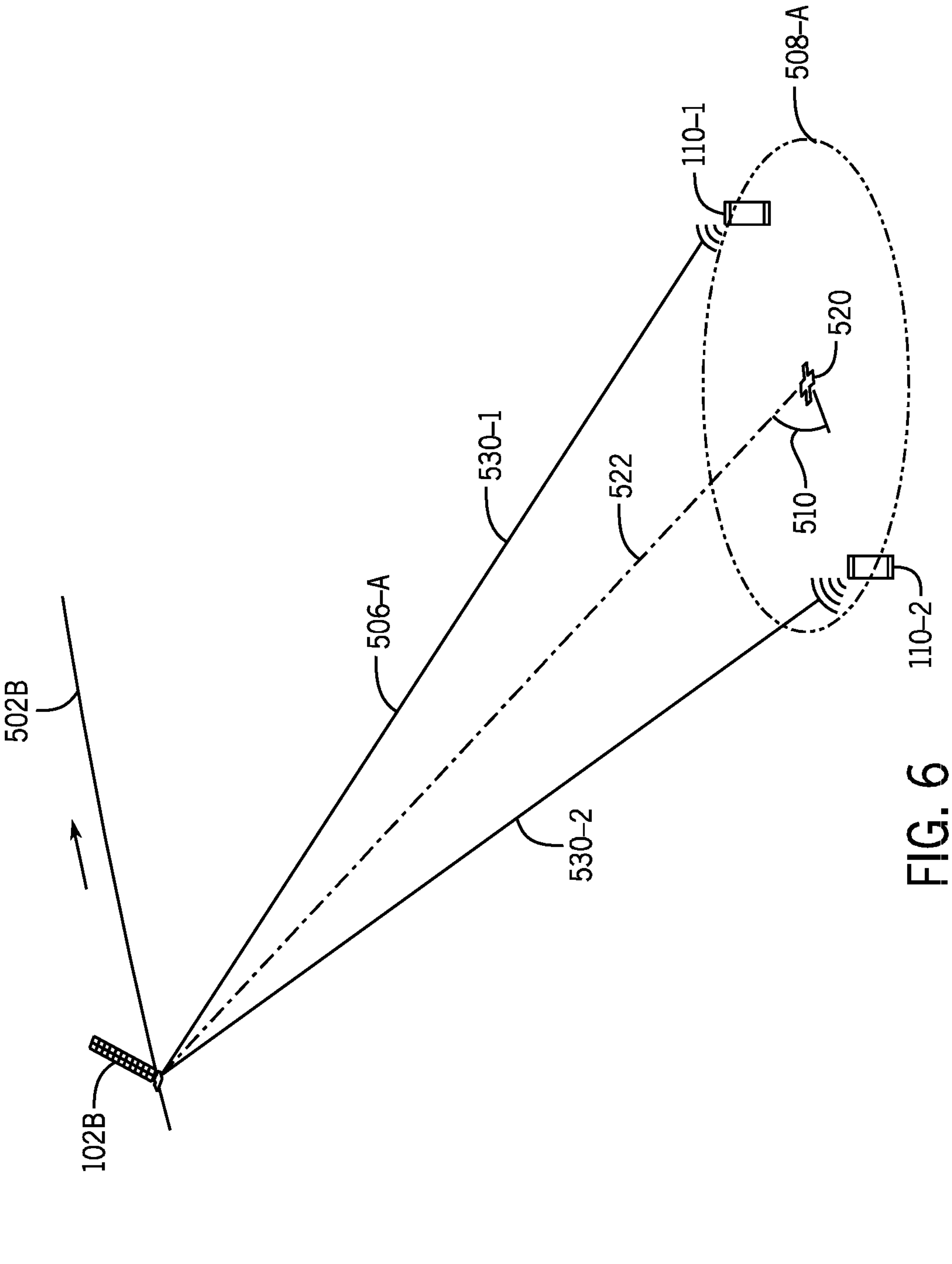
FIG. 6 illustrates a not-to-scale schematic diagram of a geometry of one of the beams and beam footprints of FIG. 5 in accordance with embodiments of the present disclosure.

FIG. 6 illustrates a not-to-scale schematic diagram of a geometry of beam 506-B and beam footprint 508-B from FIG. 5. With reference to FIGS. 5 and 6, beam 506-B is the RF carrier for one of the cells of the base station platform on the satellite 102B, and the footprint 508-B defines a service area of the cell, as noted above.

Under typical RAN protocols, uplink signals from, and downlink signals to, user equipment are partitioned across time into frames. For example, the RAN protocols for 4G LTE and 5G NR operate with frames having a ten millisecond duration, and each frame is composed of ten subframes each having a one millisecond duration. As users move throughout the coverage area of a cell, UE transmission timing is controlled by the network through procedures defined by the RAN standard so that uplink signals from all UE 110 in the service area of a cell arrive at the base station at approximately the same time. For example, the uplink signals all arrive within the cyclic prefix duration. (As understood by those of ordinary skill, a cyclic prefix (CP) is appended before a data symbol and is an identical copy of a last portion of the data symbol, generally in order to facilitate avoidance of data loss during transmission. The CP duration is defined by the standard.) In addition, the timing offset between uplink/downlink frame N at the base station remains constant (typically close to zero). The base station instructs the UE to time UE transmissions so that an uplink frame N from the UE arrives at the base station aligned in time based on when the transmission of the corresponding downlink frame N from the base station to the UE occurs. This is referred to as the downlink-uplink subframe offset in some protocols.

Typical RAN protocols are designed for terrestrial applications where the base station is stationary and the UE 110 are expected to be within a threshold distance of the base station. For example, with respect to signal latency, the 4G LTE and 5G NR standards are designed for a round-trip travel time of a wireless signal from the base station to a UE 110, and back to the base station, of less than 1 millisecond. With respect to Doppler shift, the 4G LTE and 5G NR standards are designed for an extreme case of a UE 110 travelling on a high speed train, where the maximum Doppler could be up to 0.28 parts per million (ppm), which corresponds to about 750 Hz for a carrier frequency of 2.7 GHZ. Typical RAN protocols have been designed to handle downlink frame timing, random access by UE 110, and other procedures up to these levels of signal latency and Doppler shift without sacrificing performance.

In a LEO satellite-based communication system such as satellite telecommunications system 100, due to the relative velocity of the satellite base station in a LEO system over the ground, the signal propagation delay and Doppler shift are much larger than in terrestrial cellular networks, and in addition the ranges over which the propagation delay and Doppler shift vary are much larger. For example, for a UE 110 in the beam footprint 508-A at the instant in time shown in FIG. 5, if the satellite 102B is at an altitude of 525 km and the incidence angle 510 is 37 degrees, the latency for a signal transmitted from the satellite to the UE could be as large as 3 milliseconds and the Doppler shift could be as large as 20 ppm (which corresponds to about 5,400 Hz for a carrier frequency of 2.7 GHZ). Moreover, as the satellite moves along the orbital path 502B, and the geographic sub-area covered by footprint 508-A transitions from the leading edge of the field of regard 504 (as shown in FIG. 5) to directly underneath the satellite 102B, the one-way signal latency from the satellite 102B to the UE 110 in footprint 508-A may be reduced by more than 1 millisecond, and the Doppler shift could change as much as 0.35 ppm per second.

In addition to the Doppler effect on carrier frequency, the motion of the satellite 102B during this time causes signals transmitted from the satellite to appear to the UE 110 as arriving compressed in time. For example, after one second a downlink frame boundary within the signal transmitted by the satellite would arrive at the UE 110 approximately 20 microseconds earlier than the UE 110 expected it based on the RAN standard downlink frame timing, and the UE would not be able to decode the signal. Similarly, as the satellite moves away from the UE 110, the downlink frame timing would appear expanded in time, and the UE would not be able to decode the signal.

To counteract these effects, the satellite computer system 103 can use knowledge of the satellite motion with respect to the UE 110, and adjust the symbol rate and frame timing of its transmitted signal, so the signal received by the UE 110 arrives within the limits of the RAN standard being used. In other words, while the satellite 102B is moving towards the geographic sub-area covered by a beam, the satellite computer system 103 can cause the phased array antenna 105 to transmit data on that beam slightly expanded in time; likewise, when the satellite 102B is moving away from the geographic sub-area covered by the beam, the satellite computer system 103 can cause the phased array antenna 105 to transmit data on that beam slightly compressed in time. This is referred to as SFO (sample frequency offset) and delay pre-compensation. The satellite computer system 103 can use a similar approach for processing signals received from the UE 110 ("uplink" transmissions) in the geographic sub-area covered by the beam, referred to as SFO and delay post-compensation.

It should be noted that the effects above are described for a UE 110 at a single location in the beam footprint 508-A, but significant variations in signal latency and Doppler shift may also occur within the footprint of each beam 506. For example, with reference to FIG. 6, the parameter ranges discussed above may apply to a signal 522 received at a UE located at a reference location 520 within the beam footprint 508-A. In the example embodiment, the reference location 520 corresponds to a center of the beam footprint, however, other locations within the beam footprint may alternatively be used as the reference location. There may simultaneously be a first UE 110-1 at a leading edge of the beam footprint receiving a signal 530-1, and a second UE 110-2 at a trailing edge of the beam footprint receiving a signal 530-2. In some non-limiting examples, the radius of the beam footprint 508-A could be in a range from about 20 kilometers (about 12 miles) to about 60 kilometers (about 37 miles). Thus, in addition to the magnitude of the Doppler shift present in signal 522, the difference in the Doppler shift between signals 530-1 and 530-2 could be greater than one ppm. Therefore, even after the satellite computer system 103 applies a Doppler correction to the signals to be transmitted by the beam 506-A based on the Doppler shift at the reference location 520, a significant residual Doppler shift may still be present in signals 530-1 and 530-2.

Moreover, under typical RAN protocols, each UE calibrates its uplink Doppler correction from the downlink signal it receives from the satellite. Accordingly, when UE 110-1 and 110-2 calibrate their respective uplink frequencies, the residual difference in Doppler shift in received signals 530-1 and 530-2 will be multiplied by a factor of two in uplink signals sent by the UE 110-1 and 110-2 (i.e., the uplink frequency will include both the mis-calibration of the uplink frequency due to the residual Doppler shift in the downlink signal 530-1 or 530-2, plus the same physical residual Doppler shift after the uplink is corrected at the satellite for Doppler shift based on the expected reference location value).

Scalable Satellite Computer System Architecture for a Large Number of Beams and User Equipment Significant processing power on a per-beam basis, and then on a per-user equipment basis, is required to correct for the non-standard signal properties discussed above in a way that enables satellite 102 to implement a RAN for unmodified, off-the-shelf terrestrial UE 110. As noted above, known proposals for the use of satellites to provide cellular telecommunication links to unmodified, off-the-shelf terrestrial user equipment have not successfully met these processing challenges in a fashion that scales to continuous coverage of a geographic area using a large number (e.g., greater than 100 or greater than 200) of RF beams per satellite to service many thousands of UE 110 per satellite.

Figure 7A:
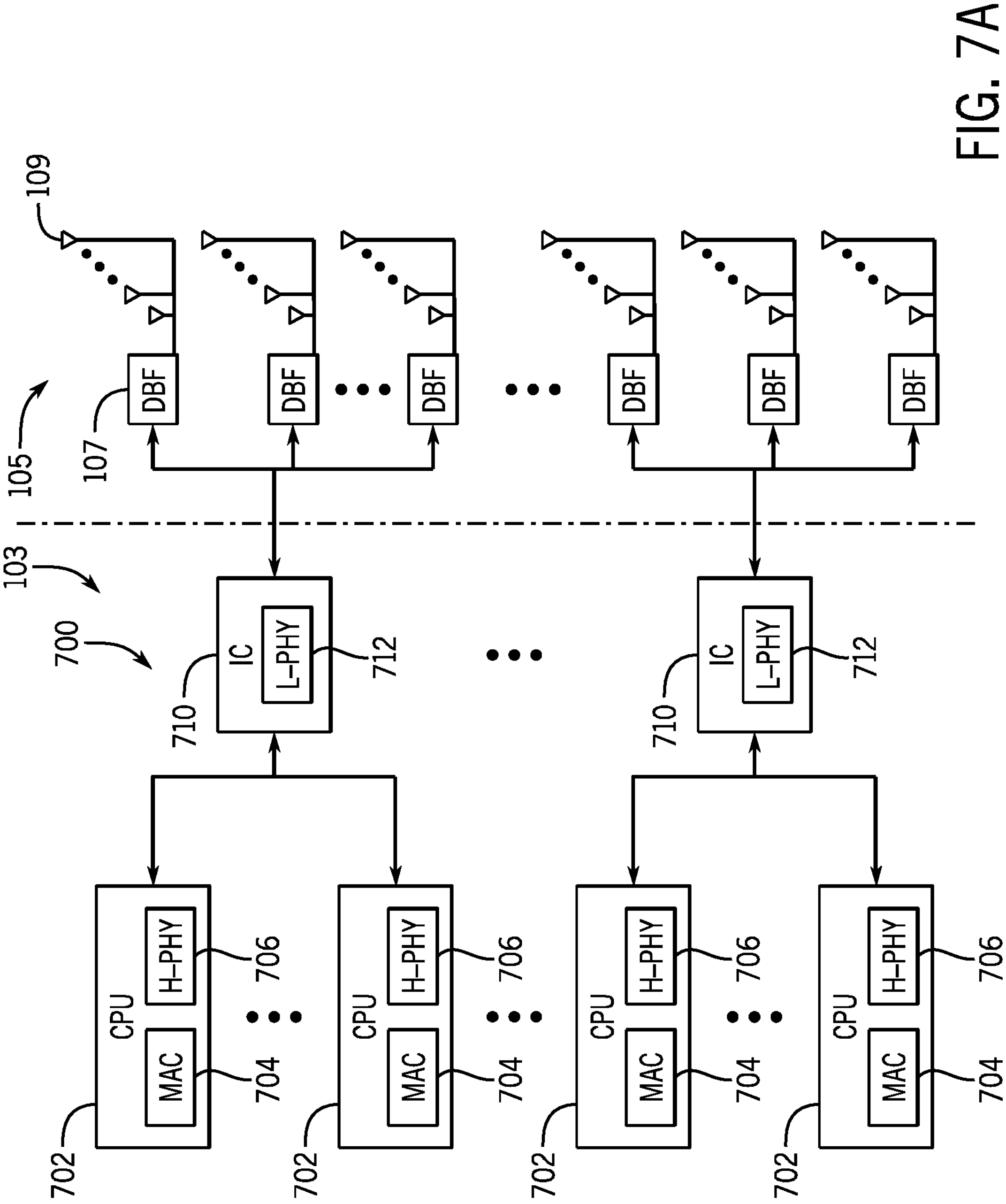
FIG. 7A illustrates a block diagram of an architecture of an exemplary satellite computer system that may be used on satellites of the satellite telecommunications system of FIGS. 1A and 1B in accordance with embodiments of the present disclosure.
Figure 7B:
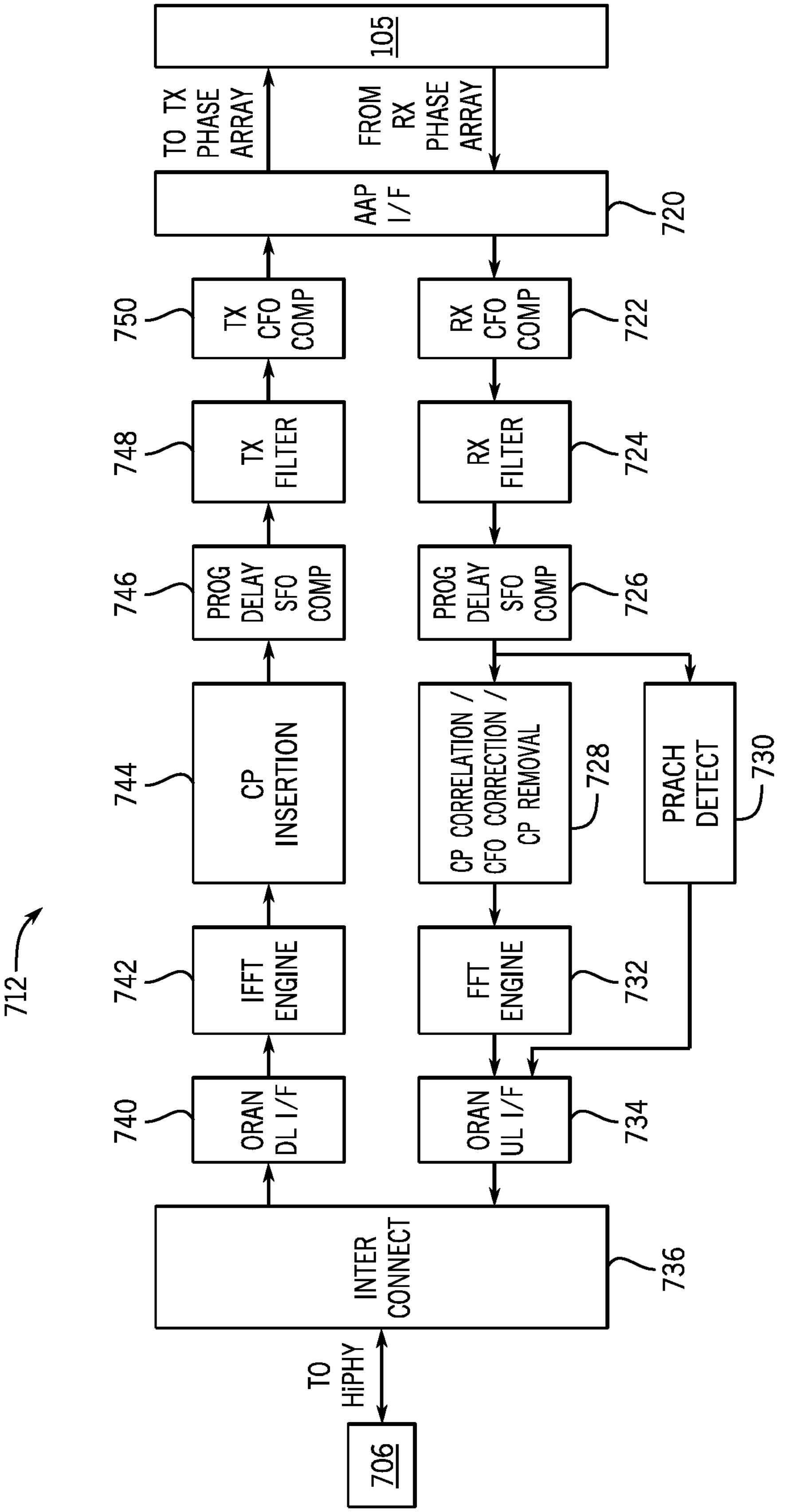
FIG. 7B illustrates a block diagram of a low physical layer that may be used in the architecture of FIG. 7A in accordance with embodiments of the present disclosure.

FIGS. 7A and 7B are block diagrams of an example architecture 700 that may be used to implement the satellite computer system 103 onboard each satellite 102. The architecture 700 includes one or more dedicated integrated circuits (IC) 710 programmed to divide the interrelated problems of signal latency, Doppler shift, and detection and handling of uplink allocation requests from UE 110 into functional blocks that streamline and simplify the necessary processing and scale appropriately.

With reference to FIG. 7A, in the illustrated example, the RAN base station protocol implemented by the satellite computer system 103 includes a Layer 1, referred to as the physical layer, and a Layer 2, referred to as a media access control (MAC) layer. The architecture 700 includes the one or more integrated circuits 710 each programmed to implement a low portion (L-PHY) module 712 of the physical layer, and at least one central processing unit (CPU) 702 programmed to implement a MAC layer module 704 and a high portion (H-PHY) module 706 of the physical layer.

In the exemplary embodiment, the phased array antenna 105 includes an array of antenna elements 109, and a plurality of digital beamformers (DBF) 111 each coupled to a respective set of the antenna elements 109. To cause the phased array antenna to transmit a directional beam 506 (shown in FIG. 5), the DBF 111 adjusts a phase difference in the driving signal sent to each antenna element 109 in the array. The phase differences are selected to cause the resulting RF beam to be directed to a target, without requiring any physical re-orientation of the antenna array itself. Similarly, to cause the phased array antenna 105 to focus on signals received from UE 110 in the direction of a particular beam 506, the DBF 111 uses the differential arrival times at each antenna element 109, based on the expected angle of incidence of signals from the selected beam direction, and combines the signals coherently to enhance reception from the desired direction (and filter out reception from other directions).

The one or more integrated circuits 710 are configured to send signal data to, and receive signal data from, the phased array antenna 105 of the satellite 102. More specifically, each L-PHY module 712 of the one or more integrated circuits 710 is configured to interface with a subset of the DBFs 111. The L-PHY module 712 is programmed to implement the necessary steps to correct the signal data received from, and transmitted to, the UE 110 for the out-of-standard effects caused by the use of the satellites 102 as base station platforms. Encapsulating these corrections within the one or more integrated circuits 710 avoids any need for modification of the digital beamforming hardware to bring the signals within the RAN standard, and thus enables the design of the DBFs 111 to be simplified and optimized for their primary function of beamforming. For example, a design for DBF 111 may be similar to a design for the digital beamformers used in the phased array antenna that communicates with the user terminals 112 (shown in FIG. 1B), which simplifies the overall design and manufacture of the satellite 102. However, implementations in which some corrections are implemented in the DBFs 111 are also contemplated.

Encapsulating these corrections within the one or more integrated circuits 710 also enables the use of standard base station Layer 1 software for the RAN in the H-PHY module 706 of the CPU 702. In other words, the signals received by the H-PHY module 706 may be operated on at the CPU 702 as if they were received from the UE 110 at a terrestrial base station. In some 4G LTE or 5G NR embodiments, the H-PHY module 706 is implemented using the FlexRAN™ architecture by Intel®. However, other implementations of the H-PHY module 706 are also contemplated.

In some embodiments, the use of integrated circuits 710 improves a speed of execution of the signal processing used to correct for the out-of-standard signal properties. In certain embodiments, each integrated circuit 710 is implemented as a field-programmable gate array (FPGA). However, other types of integrated circuits are also contemplated.

Moreover, the architecture 700 enables any number of substantially identical integrated circuits 710 to be connected in parallel with the DBFs 111 on one side, and also to be connected in parallel with any number of CPUs 702 on the other side, to scalably increase a number of UE 110 that can be simultaneously serviced by the satellite 102 without a significant degradation in service. For example, in some 4G LTE embodiments, the phased array antenna 105 places 256 beams 506 in the field of regard 504, which means that the architecture 700 must platform an eNodeB that serves 256 cells. In contrast, a typical terrestrial eNodeB may serve six cells. Further in the example, the L-PHY module 712 can be implemented on two integrated circuits 710, each of which processes the data streams for 128 cells, and the corrected data streams from the two integrated circuits can be routed to eight CPUs 702, each of which handles 32 of the 256 cells. The processing speed of the architecture 700 in such embodiments is sufficient to provide a user experience to users of UE 110 that is indistinguishable from the user experience of the same UE 110 when communicating solely via terrestrial base stations. However, other allocations of integrated circuits 710 and CPUs 702 are also contemplated.

FIG. 7B is a block diagram of an example embodiment of L-PHY module 712. In the example embodiment, L-PHY module 712 includes an adaptive antenna processing (AAP) interface 720 that interfaces with the phased array antenna 105. More specifically, on the uplink side, the AAP interface 720 receives Rx signal data from the DBFs 111. The Rx signal data represents uplink signals received by the phased array antenna originating from a target direction of each of the directional beams 506. On the downlink side, the AAP interface 720 also sends Tx signal data to the phased array antenna 105. The Tx signal data represents signals to be transmitted on each of the directional beams 506. In some embodiments, the AAP interface 720 performs no corrections associated with out-of-standard signal properties such as signal latency correction, sample frequency offset, or Doppler shift correction. However, other implementations of the AAP interface 720 are also contemplated.

In the example embodiment, the AAP interface 720 forwards a Rx data stream for each beam 506, from the Rx signal data received from the phased array antenna 105, to a receive center frequency offset (Rx CFO) compensator 722. For each beam, the Rx CFO compensator 722 calculates the expected Doppler shift for signals received from the reference location 520 (e.g., the center of the cell) at a series of points in time, based on the satellite's trajectory relative to the reference location 520. The Rx CFO compensator then applies a corresponding Doppler correction value to the Rx data stream received from the AAP interface 720 for the beam to post-compensate for the CFO present in the received signal. The Doppler correction value for each beam may change over time. For example, if the beam is steered to maintain the beam footprint on the same geographic sub-area as the satellite 102 moves towards, over, and then past the geographic sub-area, then the Doppler shift for signals originating at the reference location 520 continuously changes as the satellite 102 moves towards, over, and then past the reference location 520. The Doppler correction values for each point in time may be calculated in advance, stored, and then applied to the incoming Rx data stream as the point in time arrives. Other implementations of the RX CFO compensator 722 are also contemplated.

Notably, as discussed above with reference to FIG. 6, the Doppler correction based on the Doppler shift at the reference location is typically not sufficient, by itself, to bring the Doppler shift for the signals from every UE 110 in the cell within the Doppler limits of the RAN protocols, as some UE 110 may still exhibit significant residual Doppler shift.

However, the Doppler correction based on the Doppler shift at the reference location is sufficient to enable some intermediate signal processing, which can be done more efficiently to the Rx data stream for the beam as a whole before applying residual Doppler corrections for individual UE 110.

In the example embodiment, the Rx CFO compensator 722 forwards the reference-Doppler-compensated Rx data stream for each beam 506 to a Rx filter 724. After the Doppler shift in the Rx data stream is compensated based on the reference location 520, the Rx filter 724 can apply, for example, filters to reduce a noise level in the Rx data stream or otherwise improve signal quality. Other implementations of the Rx filter 724 are also contemplated.

In the example embodiment, the Rx filter 724 forwards the filtered Rx data stream for each beam 506 to a Rx propagation delay compensator 726. The Rx propagation delay compensator 726 may adjust a timing of the Rx data stream for each beam 506 based on its signal path length. The signal propagation delay among beams 506 differs. For example, as shown in FIG. 5, the UE-to-satellite signal path length (and hence the propagation delay) for beam 506-C is much shorter than the signal path length for the beams at the edge of the field of regard 504, such as the forwardmost beam 506-A and the rearmost beam 506-B. (Other beams around a perimeter of the field of regard 504 are not illustrated for purposes of clarity.) As described in more detail below, the Rx propagation delay compensator 726 may adjust the timing of the Rx data stream for one or more beams to equalize signal latency across the beams 506, in order to neutralize differences in propagation delay corresponding to the different signal path lengths.

For each beam 506, the Rx propagation delay compensator 726 may also adjust a timing of the samples within the Rx data stream to post-compensate for the signal compression and expansion effects caused by the relative motion of the satellite, as discussed above. For example, the Rx propagation delay compensator 726 calculates the expected compression or expansion that will be present in signals received from the reference location 520 at each point in time, based on the satellite's trajectory relative to the reference location 520. The Rx propagation delay compensator 726 then applies a corresponding SFO correction to the Rx data stream for the beam to remove the expected amount of SFO from the Rx data stream. The SFO correction for each beam may change over time. For example, if the beam is steered to maintain the beam footprint on the same geographic sub-area as the satellite 102 moves towards, over, and then past the geographic sub-area, then the sample compression/expansion for signals originating at the reference location 520 also changes as the satellite 102 moves towards, over, and then past the reference location 520. The SFO correction for each point in time may be calculated in advance, stored, and then applied to the incoming Rx data stream as the point in time arrives.

Other implementations of the Rx SFO compensator 726 are also contemplated.

In the example embodiment, the Rx propagation delay compensator 726 forwards the SFO-compensated Rx data stream for each beam 506 to a residual CFO corrector 728. After the Rx data stream has been reference-Doppler-compensated and latency-equalized, and in some embodiments sample-frequency compensated, the residual CFO corrector 728 estimates a residual CFO (i.e., a residual Doppler shift for the UE relative to the Doppler shift for a stationary UE at the reference location 520) for the UE 110 having data in the Rx data stream for the beam.

For example, as noted above, the UE inserts a cyclic prefix (CP) before each data symbol in the data it transmits to the base station platform. The CP is an identical copy of the last portion of the data symbol. The RAN protocol typically defines a length of the cyclic prefix. Based on the knowledge that the beginning and ending portions of each symbol should match over the CP length, the residual CFO corrector 728 may apply cyclic prefix correlation to data in the Rx data stream received from a particular UE 110 to obtain at least a coarse estimate of the residual CFO present in the data from that UE 110.

In certain embodiments, the residual CFO corrector 728 may refine the initial estimate based on correlating other known data elements within the data formats employed in the RAN protocol. For example, in 4G LTE or 5G NR embodiments, the uplink data frames from each UE 110 include demodulation reference signals (DMRS) at defined locations. After the coarse CFO estimate obtained from the CP correlation is applied, the residual CFO corrector 728 may apply DMRS correlation to data symbols received from a particular UE 110 to refine the residual CFO estimate for that UE 110. Other implementations of estimating the residual CFO are also contemplated.

As noted above, under typical RAN protocols, each UE 110 calibrates its uplink Doppler correction from the downlink signal it receives from the satellite. Moreover, as described in more detail below, in the example embodiment, the downlink signal to the UE 110 is pre-compensated for the Doppler effect at the reference location 520, but with no residual Doppler correction for the UE that are not at the reference location (or are not stationary). Accordingly, the Doppler shift to be corrected by the residual CFO corrector 728 will be approximately twice the physical residual Doppler shift that occurs due to the distance from (or relative motion with respect to) the reference location 520 of the UE 110. In other words, the uplink frequency will include both the residual Doppler shift due to the distance or motion relative to the reference location, plus the mis-calibration of the uplink frequency due to the (approximately identical) uncorrected residual Doppler shift in the downlink signal.

After the residual CFO corrector 728 arrives at a residual CFO estimate for the UE 110, the residual CFO corrector 728 applies a corresponding residual Doppler correction to the data associated with one or more UE. For example, the correction is applied if the residual Doppler estimate for the UE exceeds a predetermined threshold associated with signal processing quality. In some embodiments, after the residual Doppler correction is performed, the residual CFO corrector 728 also removes the cyclic prefix from the data for each UE in the Rx data stream. Other implementations of the residual CFO corrector 728 are also contemplated.

In the example embodiment, the Rx propagation delay compensator 726 also forwards the latency-equalized Rx data stream for each beam 506 to a PRACH detector 730, in parallel to the residual CFO corrector 728. The PRACH detector 730 is configured to detect requests for an uplink allocation from UE 110 that are attempting to join the RAN. More specifically, the RAN protocol typically defines a physical random access channel (PRACH) slot and an access signal format that should used by UE 110 to request the uplink allocation from the base station platform.

In some embodiments, the architecture 700 enables the PRACH detector 730 to be positioned in parallel with the residual CFO corrector 728, rather than downstream from the residual CFO corrector 728, because the PRACH detector 730 uses special properties of the access signal format to do a more precise correction for residual Doppler shift than is possible at the residual CFO corrector 728. For example, in 4G LTE or 5G NR embodiments, the access signal format is based on a Zadoff-Chu (ZC) sequence. After the Rx data stream has been reference-Doppler-compensated and sample-frequency compensated, the PRACH detector 730 is in position to seek correlations based on the properties of ZC sequences to detect access requests in the PRACH slot. In certain embodiments, the location of the PRACH detector 730 in the example architecture 700, in parallel with the residual CFO corrector 728 rather than downstream from it, reduces the required data processing burden and time at the satellite computer system 103. However, other implementations of the PRACH detector 730 are also contemplated.

In the example embodiment, the residual CFO corrector 728 forwards the residual CFO-corrected Rx data stream for each beam 506 to a fast Fourier transform (FFT) engine 732. The FFT engine 732 is configured to convert the residual CFO-corrected Rx data stream for each beam 506 to the frequency domain for input into an open RAN (ORAN) uplink interface 734. Likewise, the PRACH detector 730 may forward data regarding detected access requests to the ORAN uplink interface 734.

The ORAN uplink interface 734 may format the frequency domain data for each beam 506 and the detected access requests for routing to the H-PHY module 706 of the CPU 702, such as via a bus 736 coupling the one or more integrated circuits 710 and the CPU 702 in electronic communication. More specifically, as noted above, the H-PHY module 706 may be implemented using standard base station Layer 1 software, and the ORAN uplink interface 734 may be configured to format the frequency domain data and the PRACH detect data in an acceptable format defined by the standard software. However, other implementations of the ORAN uplink interface 734 are also contemplated.

Similarly, for the downlink path from the H-PHY module 706 to the phased array antenna 105, the H-PHY module 706 forwards data, representing signals to be transmitted on the beams 506, to an ORAN downlink interface 740 of the L-PHY module 712, again such as via the bus 736. The ORAN downlink interface 740 may be configured to accept the data in a format, such as a frequency domain format, defined by standard software implemented by the H-PHY module 706, and to re-format the data as needed for use by the L-PHY module 712. The ORAN downlink interface 740 may forward the data to an inverse fast Fourier transform (IFFT) engine 742. Other implementations of the ORAN downlink interface 740 are also contemplated. The IFFT engine 742 is configured to convert the frequency domain downlink data for each beam 506 to a time-domain Tx data stream for each beam.

In the example embodiment, the IFFT engine 742 forwards the time domain Tx data stream for each beam 506 to a cyclic prefix (CP) insertion module 744. The CP insertion module 744 inserts a cyclic prefix (CP) before each data symbol in the Tx data stream and then forwards the Tx data stream to a Tx propagation delay compensator 746. The Tx propagation delay compensator 746 may be viewed as performing the complement of the latency equalization performed by the Rx propagation delay compensator 726.

More specifically, for each beam 506, the Tx propagation delay compensator 746 adjusts a timing of the Tx data stream based on the differences in signal path lengths among the beams, which correspond to differences in signal propagation latency. The adjustment delays the transmission by the phased array antenna 105 of the Tx data stream in proportion to a signal latency of the corresponding beam, so that UE 110 in different beam footprints 508 receive the data at approximately the same time.

In some embodiments, the Tx propagation delay compensator 746 may also adjust a timing of the samples within the Tx data stream for each beam to pre-compensate for the signal compression and expansion effects that would otherwise be present in the signal received by the UE due to the relative motion of the satellite. In this respect, the Tx propagation delay compensator 746 may be viewed as performing the reverse of the compensation performed by the Rx propagation delay compensator 726, as discussed above. For example, the Tx propagation delay compensator 746 calculates the expected sample compression or expansion (due to satellite motion) that would be observed in signals transmitted from the phased array antenna 105 as they are received at the reference location 520 at each point in time, based on the satellite's trajectory relative to the reference location 520. The Tx propagation delay compensator 746 then applies a corresponding SFO correction to the Tx data stream for the beam to pre-compensate against the expected expansion or compression, so that the signal actually received at the reference location is free from the expected amount of SFO. As noted above with respect to signals received at the satellite, the SFO correction for each beam may change over time as the satellite 102 moves towards, over, and then past the reference location 520. The SFO correction for each point in time may be calculated in advance, stored, and then applied to the outgoing Tx data stream as the point in time arrives. Other implementations of the Tx propagation delay compensator 746 are also contemplated.

In the example embodiment, the Tx propagation delay compensator 746 forwards the SFO-corrected Tx data stream for each beam 506 to a Tx filter 748. The Tx filter 748 can apply, for example, filters to reduce a noise level in the Tx data stream or otherwise improve signal quality. Other implementations of the Tx filter 748 are also contemplated.

In the example embodiment, the Tx filter 748 forwards the filtered Tx data stream for each beam 506 to a transmit center frequency offset (Tx CFO) compensator 750. The Tx CFO compensator 750 may be viewed as performing the reverse of the compensation performed by the Rx CFO compensator 722.

More specifically, for each beam, the Tx CFO compensator 750 calculates the expected Doppler shift that would be seen in signals transmitted from the phased array antenna 105 as they are received at the reference location 520 at a series of points in time, based on the satellite's trajectory relative to the reference location 520. The Tx CFO compensator 750 then applies a corresponding Doppler correction value to the Tx data stream for the beam to pre-compensate against the expected Doppler shift, so that the signal actually received at the reference location 520 is free from the expected amount of CFO. As noted above with respect to signals received at the satellite, the Doppler correction value for each beam may change over time, as the satellite 102 moves towards, over, and then past the reference location 520. The Doppler correction values for each point in time may be calculated in advance, stored, and then applied to the outgoing Tx data stream as the point in time arrives. Other implementations of the Tx CFO compensator 750 are also contemplated.

In the example embodiment, the Tx CFO compensator 750 forwards the reference-Doppler-compensated Tx data stream for each beam 506 to the AAP interface 720. As noted above, the AAP interface 720 sends Tx signal data based on the Tx data streams to the phased array antenna 105, causing the corresponding signals to the UE 110 to be transmitted on each of the directional beams 506. However, other implementations of the AAP interface 720 are also contemplated.

As noted above, in the example embodiment, the architecture 700 does not provide for residual Doppler shift compensation for signals transmitted to UE 110 at locations away from the reference location 520. However, the residual Doppler that remains in the downlink signal after pre-compensation based on the reference location 520 (because the UE 110 is moving with respect to and/or is not at the reference location) is within the limits that can be handled by the UE 110. Because the UE 110 calibrates its internal uplink Doppler correction from the downlink signal it receives from the satellite 102, the residual Doppler shift in signals received at the UE 110 will be multiplied by a factor of two in uplink signals sent to the satellite 102 by the UE 110, but this is handled on the uplink side in the example embodiment by the residual CFO corrector 728. Accordingly, in some embodiments, the architecture 700 saves processing time and resources by avoiding a need for more precise residual Doppler correction in the downlink signal processing path. However, other implementations of the downlink signal processing path are also contemplated.

Latency Equalization Across Beams of the Satellite

In some embodiments, the satellite computer system 103 implements latency equalization for signals received across the beams 506. As discussed above, in some implementations, a signal transmitted by a UE 110 in the beam footprint 508-A at the instant in time shown in FIG. 5 may have a one-way signal latency to the satellite 102B as large as 3 milliseconds. The same may hold true for a UE in the beam footprint 508-B at the trailing edge of the field of regard 504. Beams 506-A and -B (and other beams 506, not illustrated, along a perimeter of the field of regard 504), may be referred to as “slant” beams because they have a highest amount of horizontal travel distance. At the same instant, a signal transmitted by a UE 110 in the beam footprint 508-C may have a one-way signal latency of about 1.75 milliseconds. Beam 506-C may be referred to as a “nadir” beam. For beams in-between the slant and nadir beams, the one-way signal latency varies between the latency values for the slant and nadir beams. As discussed above, the base station protocol for typical RAN standards, such as 4G LTE and 5G NR, is not designed to handle such a large variation in signal propagation latency across cells handled at the same base station.

In certain embodiments, the satellite computer system 103 implements a latency equalization function. The latency equalization function may be implemented in the one or more integrated circuits 710 (shown in FIG. 7A). More specifically, in some embodiments, the latency equalization function is implemented on the Rx side by the Rx propagation delay compensator 726 of the example architecture 700, and on the Tx side by the Tx propagation delay compensator 746 of the example architecture 700, as discussed above. Although the latency equalization function is described in the example below as performed by the Rx propagation delay compensator 726 and the Tx propagation delay compensator 746, however, other architectures are also contemplated for the satellite computer system 103, and implementation of the latency equalization function by one or more processors at any location within such alternative architectures of the satellite computer system 103 are also contemplated.

Figure 8:
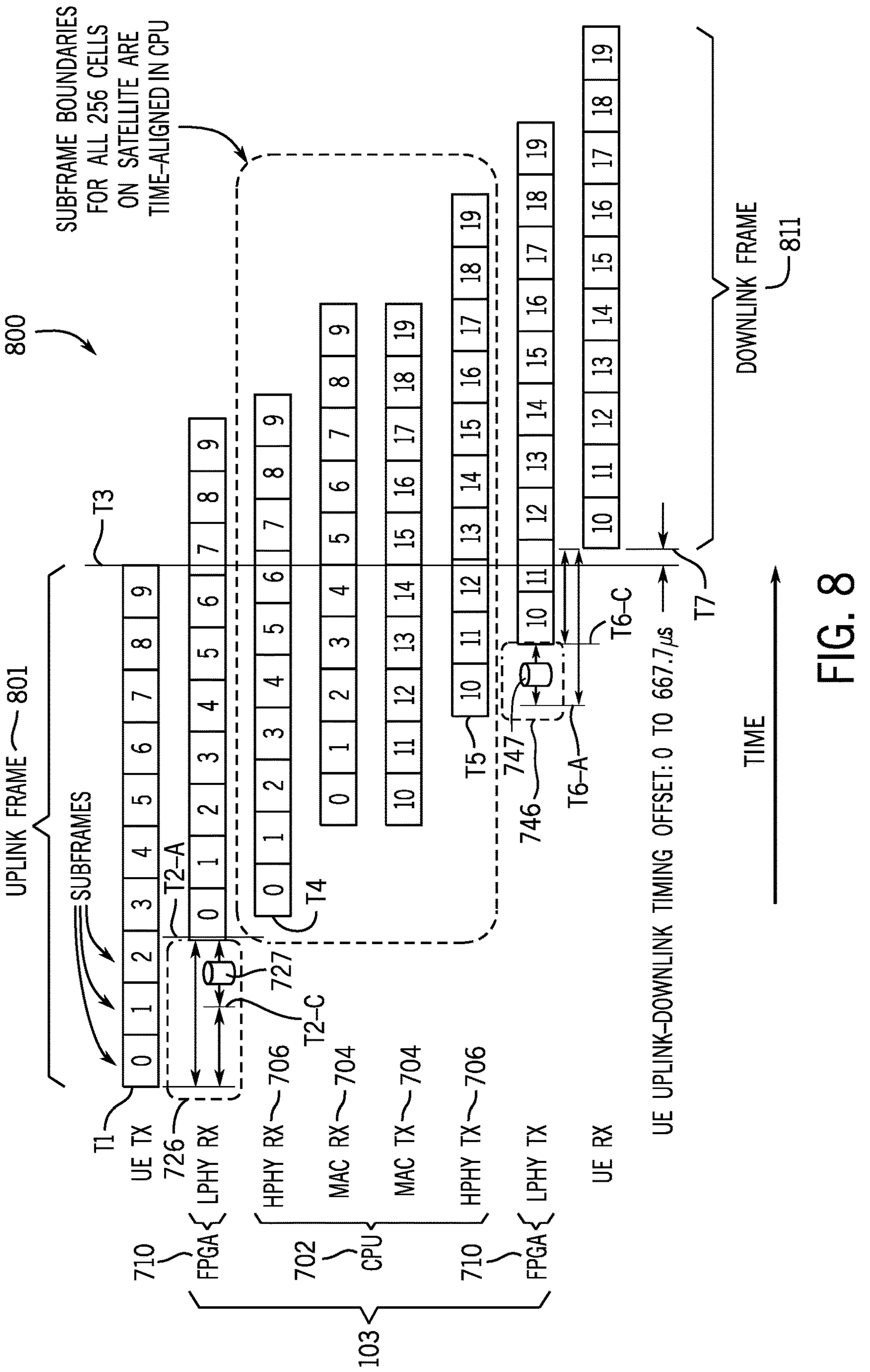
FIG. 8 illustrates a schematic data flow diagram of an example implementation of a latency equalization function by at least one processor of an exemplary satellite computer system that may be used on satellites of the satellite telecommunications system of FIGS. 1A and 1B in accordance with embodiments of the present disclosure.

FIG. 8 illustrates a schematic data flow diagram 800 of an example implementation of the latency equalization function by at least one processor of the satellite computer system 103. With reference to FIGS. 5-8. In the example embodiment, the Rx propagation delay compensator 726 determines, for a plurality of time periods, a signal latency for each of the plurality of RF beams 506. As discussed above, the signal latency may be determined based on a distance between the satellite 102B and the reference location 520 within the beam footprint 508 during the time period. The signal latency value for each beam may change over time. For example, if the beam is steered to maintain the beam footprint on the same geographic sub-area as the satellite 102 moves towards, over, and then past the geographic sub-area, then the signal latency for signals originating at the reference location 520 continuously changes as the satellite 102 moves towards, over, and then past the reference location 520.

The signal latency values for time period may be calculated in advance, stored, and then applied to the incoming Rx data stream as the time period arrives. In some embodiments, the signal latency values are calculated at 100 millisecond intervals. Additionally, interpolation between the 100 millisecond values may be used to determine the signal latency at points in time between the pre-calculated values. Other implementations of signal latency determination are also contemplated.

The UE 110 in each of the beam footprints 508 may send an uplink frame 801 at approximately the same time T1. In a typical RAN protocol, such as 4G LTE or 5G NR, each uplink frame 801 has ten subframes, labeled 0, 1, . . . , 9, and each subframe has a duration of one millisecond. Given the difference in signal latency, the uplink frames 801 from each beam arrive at the L-PHY module 712 of the satellite at different times. More specifically, the uplink frames 801 on the nadir beam 506-C arrive first at time T2-C, the uplink frames 801 on the slant beams such as 506-A and 506-B arrive last at time T2-A, and the uplink frames 801 on other beams arrive somewhere in between times T2-C and T2-A. As discussed above, T2-A and T2-C may be more than one millisecond apart.

Given this time shift across beams 506, RAN base station processing at the H-PHY module 706, at the MAC layer module 704, and at higher levels in the CPU 702, would typically have to be executed in separate processing strings or use different time references for the Rx data streams on different beams 506 in order to deliver acceptable base station performance. However, the execution of multiple strings or different time references to handle beams with different time shifts increases the processing capacity, power level, and heat dissipation required for the satellite computer system 103 by a significant degree, particularly in embodiments where the phased array antenna has as many as 256 beams. These requirements can be particularly problematic on a satellite.

In some embodiments, the Rx propagation delay compensator 726 is programmed to buffer the Rx data stream in a variable delay Rx buffer 727 in order to re-synchronize the uplink frames 801 across beams 506. As the uplink frames 801 on each beam 506 arrive at the Rx propagation delay compensator 726, the Rx propagation delay compensator 726 buffers the uplink frames 801 in the variable delay Rx buffer 727, and the buffer-delay time is beam-specific. More specifically, the variable delay Rx buffer 727 is programmed to output a buffered Rx data stream in which the uplink frames 801 across beams 506 share a matching, predetermined Rx signal latency.

In some embodiments, the predetermined Rx signal latency is selected for each period to be greater than or equal to a longest signal latency among the beams 506 for the time period. For example, the predetermined Rx signal latency may selected for each time period to be the signal latency for the slant beam, rounded up to the nearest integer millisecond. In other words, if the signal latency for beam 506-A for a first time period is 2.8 milliseconds, the predetermined Rx signal latency for the first time period is set to 3 milliseconds. However, other methods of selecting the predetermined Rx signal latency are also contemplated.

The respective buffer-delay time for each beam 506 for each time period may then be determined by subtracting the actual signal latency for the beam (as determined above based on the reference location 520 in the beam footprint 508) for the time period from the predetermined Rx signal latency for the time period. In other words, the actual signal latency for the beam plus the respective beam buffer-delay time for the beam corresponds to the predetermined Rx signal latency for the time period. Accordingly, the Rx data stream released from the variable delay Rx buffer 727 includes the uplink frames 801 re-synchronized across beams 506, so that the uplink frames 801 arrive at the H-PHY module 706 at the same time T4. In other words, the subframe boundaries in the uplink frames 801 across beams 506 remain time-aligned through the H-PHY module 706 and the MAC layer module 704.

In some embodiments, because the variable delay Rx buffer 727 outputs re-synchronized uplink frames 801 across beams 506, the variable delay Rx buffer 727 enables the satellite computer system 103 to execute a single processing string, or at least to use a common time reference for parallel processing strings, for each higher-level base station processing function (including, in the example embodiment, the H-PHY module 706 and the MAC layer module 706) to process the Rx data stream across all beams 506, which conserves processing capacity and power usage and reduces heat dissipation requirements at the satellite 102B.

In the example embodiment, the Tx propagation delay compensator 746 likewise includes a variable delay Tx buffer 747 to enable compensation for signal latency differences in downlink frames 811 transmitted from the satellite 102B to UE 110 across different beams 506. For example, the MAC layer module 704 may generate the downlink frames 811 based on information provided to the satellite 102B from the cellular core 141 via the gateway terminal 104 (shown in FIG. 1B). Similar to the uplink frames 801, the downlink frames 811 each have ten subframes, labeled 10, 11, . . . , 19, and each subframe has a duration of one millisecond. The downlink frames 811 generated by the MAC layer arrive at the H-PHY module 706 in the Tx data stream at time T5, regardless of the signal latency of the beam 506 on which they will be transmitted, and the Tx data stream then reaches the Tx propagation delay compensator 746.

UE 110 operating typical RAN protocols rely on a time of arrival of the downlink frame 811, together with a Timing Advance (TA) command sent by the base station platform, as a reference to calculate uplink subframe timing. Given the difference in signal latency across beams 506, in an absence of any latency adjustment, the downlink frames 811 on some beams 506 would arrive at the UE 110 at times so different that the TA command by itself would be unable to synchronize the resulting uplink subframe timing across the UE. More specifically, the downlink frames 811 on the nadir beam 506-C would arrive first, the downlink frames 811 on the slant beams such as 506-A and 506-B would arrive last, and the downlink frames 811 on other beams would arrive somewhere in between. As discussed above, the downlink frame 811 arrival times at the UE 110 in the beam footprint 508-A and the UE 110 in the beam footprint 508-C may be more than one millisecond apart. By contrast, in RAN protocols such as 4G LTE, the maximum timing advance is 667.7 microseconds (that is, much less than one millisecond).

The Tx propagation delay compensator 746 is programmed to buffer the Tx data stream in the variable delay Tx buffer 747 in order to synchronize the arrival of the downlink frames 811 at the UE 110 across beams 506. As the downlink frames 811 to be transmitted on each beam 506 arrive at the Tx propagation delay compensator 746, the Tx propagation delay compensator 746 buffers the downlink frames 811 in the variable delay Tx buffer 747, and the buffer-delay time is again beam-specific. More specifically, the variable delay Tx buffer 747 is programmed to output a buffered Tx data stream in which the downlink frames 811 across beams 506 will share a matching, predetermined Tx signal latency between the satellite 102B and the respective UE 110.

In some embodiments, the predetermined Tx signal latency is again selected for each period to be greater than or equal to a longest signal latency among the beams 506 for the time period. For example, the predetermined Tx signal latency may selected for each time period to be the signal latency for the slant beam, rounded up to the nearest integer millisecond. In other words, if the signal latency for beam 506-A for a first time period is 2.8 milliseconds, the predetermined Tx signal latency for the first time period is set to 3 milliseconds. It may be noted that in the example embodiment, the predetermined Tx signal latency matches the predetermined Rx signal latency. However, other methods of selecting the predetermined Tx signal latency are also contemplated.

The respective buffer-delay time for each beam 506 for each time period may again be determined by subtracting the actual signal latency for the beam (as determined above based on the reference location 520 in the beam footprint 508) for the time period from the predetermined Tx signal latency for the time period. In other words, the actual signal latency for the beam plus the respective beam buffer-delay time for the beam corresponds to the predetermined Tx signal latency for the time period. Accordingly, the Tx data stream released from the variable delay Tx buffer 747 includes the downlink frames 811 distributed in time across beams 506, so that the downlink frames 811 arrive at the UE 110 at the same time T7, regardless of beam 506. More specifically, the downlink frames 811 for the slant beams, such as 506-A and 506-B, are forwarded for transmission first at time T6-A, the downlink frames 811 for the nadir beam 506-C are forwarded for transmission last at time T6-C, and the downlink frames 811 for other beams are forwarded for transmission somewhere in between times T6-C and T6-A in accordance with their respective beam signal latency. In other words, the time of arrival of the downlink frames 811 at the UE 110 across beams 506 is time-aligned at time T7.

In some embodiments, the variable delay Tx buffer 747 enables the base station platform implemented by the satellite computer system 103 to preserve the uplink/downlink timing offset between uplink frame 801 and downlink frame 811 for each UE 110 at the reference location within the standard for the RAN protocol at the UE 110. For example, the 4G LTE standard expects the uplink/downlink timing offset to be set between zero and 667.7 microseconds. For an uplink frame 801 transmission completed by the UE 110 at time T3, the use of the variable delay Tx buffer 747 enables the downlink frame 811 to arrive, synchronized for UE 110 at the reference location 520 across beams 506, at time T7 within the uplink/downlink timing offset, as illustrated in FIG. 8.

In certain embodiments, the use of the variable delay Rx buffer 727 and the variable delay Tx buffer 747 may cause the data streams provided to and from the H-PHY module 706 and the MAC layer module 704 appear as if the UE 110 maintain an approximately constant signal propagation latency (i.e., approximately the predetermined Rx and Tx signal latency) throughout the pass of the satellite 102 over the geographic sub-area covered by the beam footprint.

After implementing the beam timing adjustments using the variable delay Tx buffer 747, residual downlink timing differences may occur for UE 110 located away from the reference location 520 in the beam footprint 508. For example, at the time illustrated in FIG. 6 for the beam footprint 508-A, signal 530-1 has a slightly longer path length from the satellite 102B to UE 110-1, relative to the path length of signal 522 to the reference location 520, and signal 530-2 has a slightly shorter path length to UE 110-2 relative to the path length of signal 522. In certain embodiments, the Tx propagation delay compensator 746 further uses the Timing Advance (TA) command defined by the RAN protocol to instruct the UE 110 to adjust for these residual signal timing differences between the reference location 520 and the location of the UE 110. The Tx propagation delay compensator 746 may insert the necessary TA commands into the Tx data stream for transmission in the standard RAN format expected by the UE 110.

Standard RAN base station protocols typically transmit a separate TA command for each UE 110. Under typical RAN base station protocols, a base station can only send a TA command to a UE 110 in response to receiving an uplink transmission from the UE, and measuring the UE-specific timing error. This necessitates regular uplink transmissions by the UE 110 even if the UE 110 has no other data to send, which uses bandwidth that would otherwise be open. Accordingly, sending a separate TA command for each individual UE 110 may impose significant bandwidth overhead on the satellite computer system 103, reducing the bandwidth available for user communications.

In order to reduce this overhead, in some embodiments, the satellite computer system 103 modifies the standard RAN process for TA commands. For example, the bandwidth overhead associated with sending TA commands to every UE 110 may be reduced by generating TA commands without requiring an uplink communication from the UE 110. In some embodiments, the Tx propagation delay compensator 746 proactively predicts future timing adjustments that will be required for the UE 110, based on the known trajectory of the satellite 102 and stored information about past timing adjustments of the UE 110. The stored information provides historical data about how a timing adjustment of the UE 110 has changed over time. The Tx propagation delay compensator 746 can generate the TA command for the UE based on the prediction, without the need for the UE to continue to send uplink transmissions for direct timing error measurement.

Additionally or alternatively, the Tx propagation delay compensator 746 may, for each beam 506, group UE 110 within ranges of residual downlink timing difference relative to the reference location 520. For example, UE 110 located near each other, or UE 110 in different physical locations that share a distance from the satellite 102B as the satellite moves along its orbital path 502B, may be assigned to the same TA group. The Tx propagation delay compensator 746 may then send a joint TA command to the UE on a per-group basis, without performing a direct timing error measurement for each UE in the group.

Additionally or alternatively, in some embodiments, the Tx propagation delay compensator 746 may select a location for the reference location 520 that reduces a number of TA commands needed. Although the reference location 520 is illustrated at the center of the beam footprint in FIG. 6, other placements of the reference location are also possible, and the placement may change over time. For example, in many cases UE 110 are not uniformly distributed throughout a beam footprint 508, but rather are located primarily in one or more clusters within the beam footprint. The Tx propagation delay compensator 746 may be configured to identify a cluster of UE 110 in the geographic sub-area covered by the beam footprint 508, based for example on known population data or UE usage data, and to select the reference location 520 to be the geographic center of the cluster. The need for TA commands for the UE 110 in the cluster may then be reduced or eliminated. However, other criteria for the selection of the reference location 520 for each beam footprint 508 are also contemplated.

Other implementations for residual timing difference corrections are also contemplated.

As noted above, one or both of the Rx propagation delay compensator 726 and the Tx propagation delay compensator 746 may also implement sample frequency offset (SFO) correction. In some embodiments, the variable delay Rx buffer 727 and the variable delay Tx buffer 747 may further be used to implement the SFO correction. For example, for each beam in the Rx data stream, the Rx propagation delay compensator 726 may calculate the expected compression or expansion in the sample frequency that will be present in signals received from the reference location 520 at each point in time, based on the satellite's trajectory relative to the reference location 520. The Rx propagation delay compensator 726 may then apply a corresponding SFO correction to the Rx data stream for the beam, to remove the expected amount of SFO from the Rx data stream, as the Rx data stream is written into (or alternatively, extracted from) the variable delay Rx buffer 727. Similarly, for each beam in the Tx data stream, the Tx propagation delay compensator 746 may calculate the expected sample compression or expansion in the sample frequency that would be observed in signals transmitted from the phased array antenna 105 as they are received at the reference location 520 at each point in time, based on the satellite's trajectory relative to the reference location 520. The Tx propagation delay compensator 746 may then apply a corresponding SFO correction to the Tx data stream for the beam, to pre-compensate against the expected expansion or compression, as the Tx data stream is written into (or alternatively, extracted from) the variable delay Tx buffer 747. Accordingly, in some embodiments, the variable delay Rx buffer 727 and the variable delay Tx buffer 747 advantageously streamline the processing functions of the satellite computer system 103 by combining SFO correction and signal propagation latency handling in the same data structure.

Figure 9:
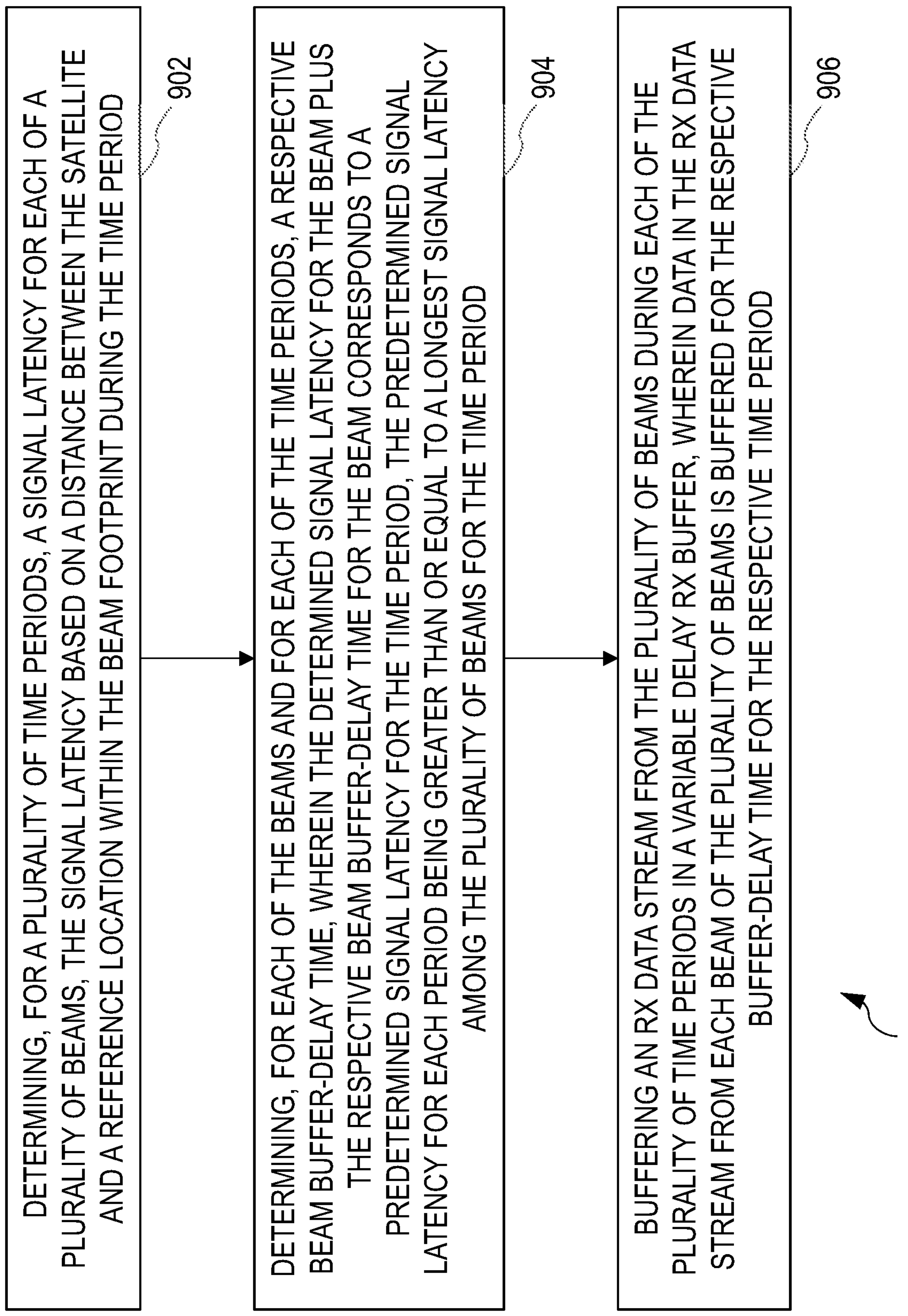
FIG. 9 illustrates an example method in accordance with embodiments of the present disclosure.

FIG. 9 illustrates an example method related to using a group of satellites to provide cellular telecommunications base station services to terrestrial user equipment. The satellite includes a phased array antenna configured to send and receive signals to terrestrial user equipment (UE) on a radio access network (RAN) via a plurality of directional beams, and each of the beams has a beam footprint that defines a cell of the RAN. The satellite computer system includes at least one processor. A method 900 of operating the satellite computer system of the satellite can include steps performed by the at least one processor including one or more of: determining, for a plurality of time periods, a signal latency for each of the plurality of beams, the signal latency based on a distance between the satellite and a reference location within the beam footprint during the time period (902); determining, for each of the plurality of beams for each of the time periods, a respective beam buffer-delay time, wherein the determined signal latency for the beam plus the respective beam buffer-delay time for the beam corresponds to a predetermined signal latency for the time period, the predetermined signal latency for each period being greater than or equal to a longest signal latency among the plurality of beams for the time period (904); and buffering an Rx data stream from the plurality of beams during each of the plurality of time periods in a variable delay Rx buffer, wherein data in the Rx data stream from each beam of the plurality of beams is buffered for the respective buffer-delay time for the respective time period (906).

A system embodiment can include a satellite computer system for a satellite, the satellite including a phased array antenna configured to send and receive signals to terrestrial user equipment (UE) on a radio access network (RAN) via a plurality of directional beams, each of the beams having a beam footprint that defines a cell of the RAN. The satellite computer system includes at least one processor in communication with a memory, the memory storing computer-readable instructions that are executable to cause the at least one processor to perform steps that can include one or more of: determining, for a plurality of time periods, a signal latency for each of the plurality of beams, the signal latency based on a distance between the satellite and a reference location within the beam footprint during the time period; determining, for each of the plurality of beams for each of the time periods, a respective beam buffer-delay time, wherein the determined signal latency for the beam plus the respective beam buffer-delay time for the beam corresponds to a predetermined signal latency for the time period, the predetermined signal latency for each period being greater than or equal to a longest signal latency among the plurality of beams for the time period; and buffering an Rx data stream from the plurality of beams during each of the plurality of time periods in a variable delay Rx buffer, wherein data in the Rx data stream from each beam of the plurality of beams is buffered for the respective buffer-delay time for the respective time period.

In some embodiments, the variable delay Rx buffer is configured to align subframe boundaries of the buffered Rx data stream across the plurality of beams. The method or instruction-caused steps may additionally or alternatively include outputting the subframe-boundary-aligned buffered Rx data stream to at least one of a high portion (H-PHY) of a physical layer module of the satellite computer system and a media access control (MAC) layer module of the satellite computer system. Additionally or alternatively, the at least one processor may include an integrated circuit and a central processing unit (CPU), the integrated circuit is configured to perform the step of buffering the Rx data stream, and the CPU is configured to implement the at least one of the H-PHY module and the MAC layer module.

In certain embodiments, the step of buffering the Rx data stream may include adjusting a timing of Rx samples stored in the variable delay Rx buffer for each beam to post-compensate for signal compression and expansion effects caused by a trajectory of the satellite relative to the reference location.

In some embodiments, the method or instruction-caused steps may additionally or alternatively include, prior to buffering the Rx data stream, post-compensating an expected Doppler shift in the Rx data stream, the expected Doppler shift based on a trajectory of the satellite relative to the reference location.

In certain embodiments, the method or instruction-caused steps may additionally or alternatively include receiving a Tx data stream representing Tx signals to be transmitted to the UE via the plurality of beams, and buffering the Tx data stream during each of the plurality of time periods in a variable delay Tx buffer, wherein data in the Tx data stream for each beam of the plurality of beams is buffered for the respective buffer-delay time for the respective time period. In some such embodiments, the variable delay Tx buffer is configured to align a time of arrival of downlink frames in the Tx data stream at the reference location across the plurality of beams. The method or instruction-caused steps may additionally or alternatively include outputting the buffered Tx data stream to the phased array antenna such that an uplink/downlink timing offset between a time of transmission of uplink frames by the UE and the time of arrival of the downlink frames at the reference location is within a standard for the RAN.

In some embodiments, the method or instruction-caused steps may additionally or alternatively include predicting future timing adjustments that will be required for the UE to correct residual downlink timing differences relative to the reference location, based on a trajectory of the satellite and stored information about past timing adjustments of the UE, and generating a Timing Advance (TA) command for the UE based on the prediction.

In certain embodiments, the method or instruction-caused steps may additionally or alternatively include grouping, for each beam, the UE within ranges of residual downlink timing difference relative to the reference location, and sending a joint timing advance (TA) command to the UE on a per-group basis.

In some embodiments, the method or instruction-caused steps may additionally or alternatively include identifying a cluster of the UE in the beam footprint of one of the beams, and selecting the reference location for the one of the beams to be a geographic center of the cluster.

In certain embodiments, the step of buffering the Tx data stream includes adjusting a timing of Tx samples stored in the variable delay Tx buffer for each beam to pre-compensate for signal compression and expansion effects caused by a trajectory of the satellite relative to the reference location.

Figure 10:
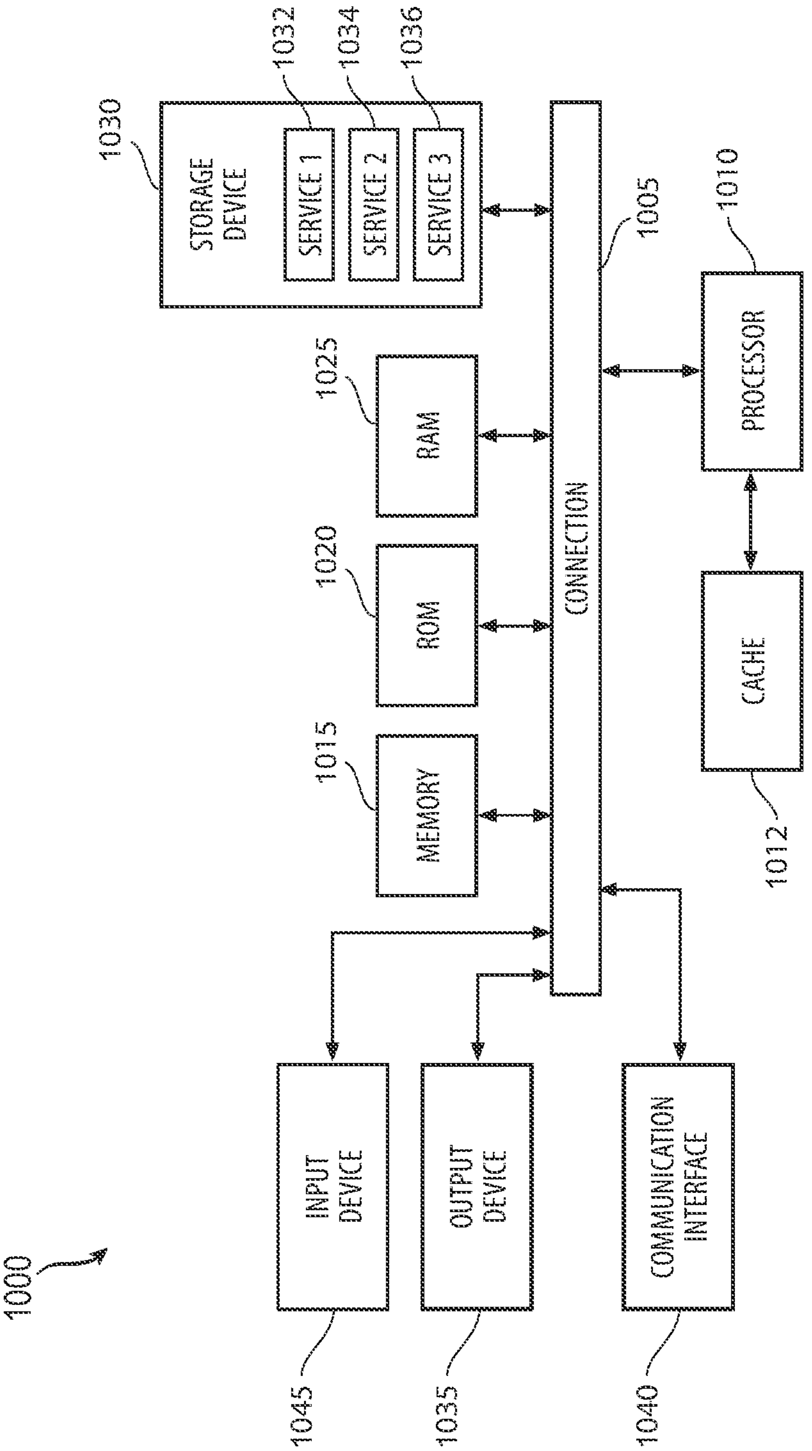
FIG. 10 illustrates a computer system that can be implemented with other aspects of the present disclosure.

FIG. 10 illustrates an example computer device that can be used in connection with any of the systems or components of the satellite computer system 103, the gateway terminal 104, the PoP 140, the cellular core 141, the terrestrial telecommunications provider 200, the UE 110, the user terminal 112, the ground-based server 150, or other components disclosed herein. In this example, FIG. 10 illustrates a computing system 1000 including components in electrical communication with each other using a connection 1005, such as a bus. System 1000 includes a processing unit (CPU or processor) 1010 and a system connection 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1—1032, service 2—1034, and service 3—1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the system 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the system 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

In some embodiments, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A satellite computer system for a satellite, the satellite including a phased array antenna configured to send and receive signals to terrestrial user equipment (UE) on a radio access network (RAN) via a plurality of directional beams, each of the beams having a beam footprint that defines a cell of the RAN, the satellite computer system comprising at least one processor in communication with a memory, the memory storing computer-readable instructions that are executable to cause the at least one processor to perform steps including:

determining, for each time period of a plurality of time periods, a signal latency for each of the plurality of directional beams, the signal latency based on a distance between the satellite and a reference location within the beam footprint during the respective time period;

determining, for each directional beam of the plurality of directional beams for each time period of the plurality of time periods, a respective beam buffer-delay time, wherein the determined signal latency for the respective directional beam plus the respective beam buffer-delay time for the respective directional beam corresponds to a predetermined signal latency for the respective time period, the predetermined signal latency for the respective time period being greater than or equal to a longest signal latency among the plurality of directional beams for the respective time period; and buffering an Rx data stream from the plurality of directional beams during each time period of the plurality of time periods in a variable delay Rx buffer, wherein data in the Rx data stream from each directional beam of the plurality of directional beams is buffered for the respective beam buffer-delay time for the respective time period.

2. The satellite computer system according to claim 1, wherein the variable delay Rx buffer is configured to align subframe boundaries of the buffered Rx data stream across the plurality of directional beams.

3. The satellite computer system according to claim 2, wherein the steps further include outputting the subframe-boundary-aligned buffered Rx data stream to at least one of a high portion (H-PHY) of a physical layer module of the satellite computer system and a media access control (MAC) layer module of the satellite computer system.

4. The satellite computer system according to claim 3, wherein the at least one processor includes an integrated circuit and a central processing unit (CPU), and wherein the computer-readable instructions are executable to:

cause the integrated circuit to perform the step of buffering the Rx data stream; and cause the CPU to implement the at least one of the H-PHY module and the MAC layer module.

5. The satellite computer system according to claim 1, wherein the step of buffering the Rx data stream includes adjusting a timing of Rx samples stored in the variable delay Rx buffer for each beam to post-compensate for signal compression and expansion effects caused by a trajectory of the satellite relative to the reference location.

6. The satellite computer system according to claim 1, wherein the steps further include, prior to buffering the Rx data stream, post-compensating an expected Doppler shift in the Rx data stream, the expected Doppler shift based on a trajectory of the satellite relative to the reference location.

7. The satellite computer system according to claim 1, wherein the steps further include:

receiving a Tx data stream representing Tx signals to be transmitted to the UE via the plurality of directional beams; and buffering the Tx data stream during each time period of the plurality of time periods in a variable delay Tx buffer, wherein data in the Tx data stream for each beam of the plurality of directional beams is buffered for the respective beam buffer-delay time for the respective time period.

8. The satellite computer system according to claim 7, wherein the variable delay Tx buffer is configured to align a time of arrival of downlink frames in the Tx data stream at the reference location across the plurality of directional beams.

9. The satellite computer system according to claim 8, wherein the steps further include outputting the buffered Tx data stream to the phased array antenna such that an uplink/downlink timing offset between a time of transmission of uplink frames by the UE and the time of arrival of the downlink frames at the reference location is within a standard for the RAN.

10. The satellite computer system according to claim 9, wherein the steps further include:

predicting future timing adjustments that will be required for the UE to correct residual downlink timing differences relative to the reference location, based on a trajectory of the satellite and stored information about past timing adjustments of the UE; and generating a Timing Advance (TA) command for the UE based on the prediction.

11. The satellite computer system according to claim 9, wherein the steps further include:

grouping, for each beam, the UE within ranges of residual downlink timing difference relative to the reference location; and sending a joint timing advance (TA) command to the UE on a per-group basis.

12. The satellite computer system according to claim 9, wherein the steps further include:

identifying a cluster of the UE in the beam footprint of one of the plurality of directional beams; and selecting the reference location for the one of the plurality of directional beams to be a geographic center of the cluster.

13. The satellite computer system according to claim 7, wherein the step of buffering the Tx data stream includes adjusting a timing of Tx samples stored in the variable delay Tx buffer for each beam to pre-compensate for signal compression and expansion effects caused by a trajectory of the satellite relative to the reference location.

14. A method of operating a satellite computer system of a satellite, the satellite including a phased array antenna configured to send and receive signals to terrestrial user equipment (UE) on a radio access network (RAN) via a plurality of directional beams, each of the beams having a beam footprint that defines a cell of the RAN, the satellite computer system comprising at least one processor, the method comprising steps performed by the at least one processor of:

determining, for each time period of a plurality of time periods, a signal latency for each of the plurality of directional beams, the signal latency based on a distance between the satellite and a reference location within the beam footprint during the respective time period;

determining, for each directional beam of the plurality of directional beams for each time period of the plurality of time periods, a respective beam buffer-delay time, wherein the determined signal latency for the respective directional beam plus the respective beam buffer-delay time for the respective directional beam corresponds to a predetermined signal latency for the respective time period, the predetermined signal latency for the respective time period being greater than or equal to a longest signal latency among the plurality of directional beams for the respective time period; and buffering an Rx data stream from the plurality of directional beams during each time period of the plurality of time periods in a variable delay Rx buffer, wherein data in the Rx data stream from each directional beam of the plurality of directional beams is buffered for the respective beam buffer-delay time for the respective time period.

15. The method according to claim 14, wherein the variable delay Rx buffer is configured to align subframe boundaries of the buffered Rx data stream across the plurality of directional beams.

16. The method according to claim 15, wherein the steps further include outputting the subframe-boundary-aligned buffered Rx data stream to at least one of a high portion (H-PHY) of a physical layer module of the satellite computer system and a media access control (MAC) layer module of the satellite computer system.

17. The method according to claim 16, wherein the at least one processor includes an integrated circuit and a central processing unit (CPU), and wherein:

the step of buffering the Rx data stream is performed by the integrated circuit; and the at least one of the H-PHY module and the MAC layer module is implemented by the CPU.

18. The method according to claim 14, wherein the step of buffering the Rx data stream includes adjusting a timing of Rx samples stored in the variable delay Rx buffer for each beam to post-compensate for signal compression and expansion effects caused by a trajectory of the satellite relative to the reference location.

19. The method according to claim 14, wherein the steps further include, prior to buffering the Rx data stream, post-compensating an expected Doppler shift in the Rx data stream, the expected Doppler shift based on a trajectory of the satellite relative to the reference location.

20. The method according to claim 14, wherein the steps further include:

receiving a Tx data stream representing Tx signals to be transmitted to the UE via the plurality of directional beams; and buffering the Tx data stream during each time period of the plurality of time periods in a variable delay Tx buffer, wherein data in the Tx data stream for each directional beam of the plurality of directional beams is buffered for the respective beam buffer-delay time for the respective time period.

* * * * *